(12) United States Patent
Carter, II

(10) Patent No.: US 10,212,319 B1
(45) Date of Patent: Feb. 19, 2019

(54) CAMERA POSITIONING FIXTURE

(71) Applicant: AMAZON TECHNOLOGIES, INC., Seattle, WA (US)

(72) Inventor: Thomas Edward Carter, II, Issaquah, WA (US)

(73) Assignee: AMAZON TECHNOLOGIES, INC., Seattle, WA (US)

(*) Notice: Subject to any disclaimer, the term of this patent is extended or adjusted under 35 U.S.C. 154(b) by 481 days.

(21) Appl. No.: 14/532,560

(22) Filed: Nov. 4, 2014

(51) Int. Cl.
*G03B 17/00* (2006.01)
*H04N 5/225* (2006.01)
*G06K 9/00* (2006.01)

(52) U.S. Cl.
CPC ....... *H04N 5/2253* (2013.01); *G06K 9/00288* (2013.01)

(58) Field of Classification Search
USPC ........................................... 396/427
See application file for complete search history.

(56) References Cited

U.S. PATENT DOCUMENTS

| | | | |
|---|---|---|---|
| 5,347,431 A * | 9/1994 | Blackwell | F21V 21/34 362/11 |
| 7,225,980 B2 | 6/2007 | Ku et al. | |
| 7,949,568 B2 * | 5/2011 | Fano | G06K 9/00 356/4.03 |
| 8,009,864 B2 | 8/2011 | Linaker et al. | |
| 8,189,855 B2 | 5/2012 | Opalach et al. | |
| 8,630,924 B2 | 1/2014 | Groenevelt et al. | |
| 9,230,250 B1 * | 1/2016 | Parker | G06Q 20/203 |
| 9,235,928 B2 | 1/2016 | Medioni et al. | |
| 2004/0017929 A1 * | 1/2004 | Bramblet | G07C 9/025 382/103 |
| 2006/0032915 A1 * | 2/2006 | Schwartz | G06Q 20/208 235/383 |
| 2006/0139314 A1 * | 6/2006 | Bell | A63F 13/02 345/156 |
| 2008/0011836 A1 * | 1/2008 | Adema | G06Q 10/00 235/383 |
| 2008/0077510 A1 * | 3/2008 | Dielemans | G06Q 10/087 705/28 |
| 2009/0204512 A1 * | 8/2009 | Connell, II | G06Q 10/087 705/28 |

(Continued)

OTHER PUBLICATIONS

Asthana, et al., "An indoor wireless system for personalized shopping assistance", CiteSeerX, In Proceedings of IEEE Workshop on Mobile Computing Systems and Applications, 1994; [retrieved on Jun. 30, 2013]. Retrieved from the Internet: <URL:http://citeseerx.ist.psu.edu/viewdoc/summary?doi=10.1.1.127.3033>.

(Continued)

*Primary Examiner* — Rodney E Fuller
(74) *Attorney, Agent, or Firm* — Lindauer Law, PLLC

(57) ABSTRACT

An overhead fixture supports a plurality of cameras used to acquire images associated with a scene during operation of a facility. In one implementation, a first set of cameras are mounted to acquire images of faces of users, while a second set of cameras are mounted to acquire images of inventory locations. One or more light sources may be mounted on the overhead fixture and activated to produce light. The light may illuminate one or more of the users, the items, or other portions of the scene. Brilliance of the light sources may also obscure the plurality of cameras from observation by the users.

20 Claims, 8 Drawing Sheets

(56) References Cited

U.S. PATENT DOCUMENTS

| | | |
|---|---|---|
| 2011/0011936 A1 | 1/2011 | Morandi et al. |
| 2012/0284132 A1 | 11/2012 | Kim et al. |
| 2013/0284806 A1 | 10/2013 | Margalit |
| 2015/0029339 A1* | 1/2015 | Kobres ............... G06Q 30/00 348/150 |
| 2015/0086107 A1* | 3/2015 | Dedeoglu .......... G06K 9/00771 382/154 |
| 2015/0262116 A1* | 9/2015 | Katircioglu ........ G06K 9/00771 705/28 |
| 2015/0354949 A1* | 12/2015 | Lecky .................. G06F 3/017 702/150 |

OTHER PUBLICATIONS

Kalnikaite, et al., "How to Nudge In Situ: Designing Lambent Devices to Deliver Information Salience in Supermarkets", ACM, In proceeding of: UbiComp 2011: Ubiquitous Computing, 13th International Conference, UbiComp 2011, Beijing, China, Sep. 17-21, 2011. Retrieved from Internet: <URL:http://www.researchgate.net/publication/221568350_How_to_nudge_in_Situ_designing_lambent_devices_to_deliver_salient_information_in_supermarkets>.

Pop, Cristian, "Introduction to the BodyCom Technology", AN1391, DS01391A, Microchip Technology, Inc., May 2, 2011.

\* cited by examiner

CAMERA POSITIONING FIXTURE

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. Likewise, physical stores maintain inventory in customer accessible areas (e.g., shopping area), and customers can pick items from inventory and take them to a cashier for purchase, rental, and so forth. Many of those physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and so forth. In each instance, for an item to be moved from one location to another, it is picked from its current location and transitioned to a new location. It is often desirable to monitor the movement of inventory, users, and other objects within the facility. This monitoring may be provided using sensors, such as cameras.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
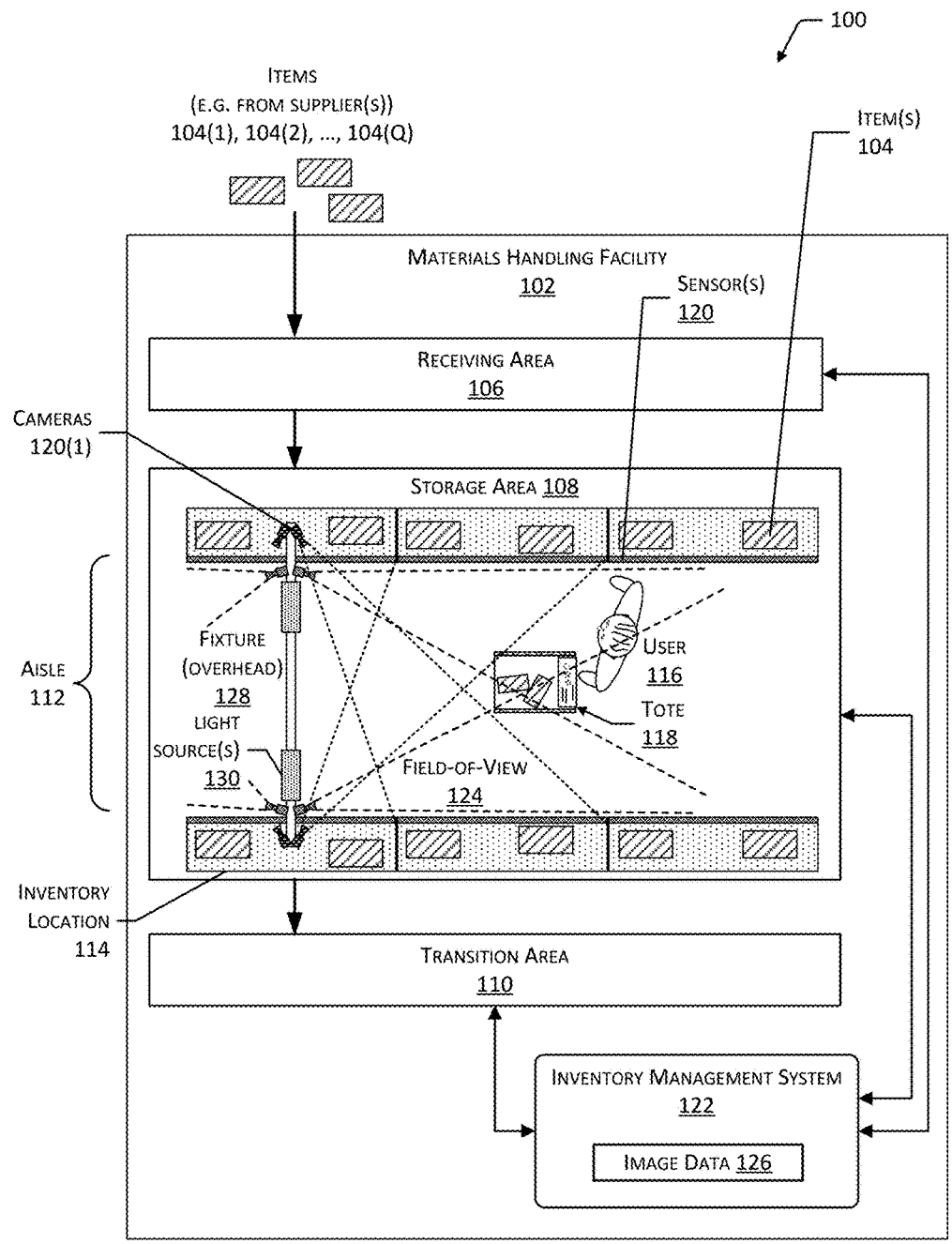
FIG. 1 is a block diagram illustrating a materials handling facility comprising a fixtures supporting multiple cameras, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes fixtures for supporting cameras that may be used in a materials handling facility (facility) or other setting. The facility may include, or have access to, an inventory management system. The inventory management system may be configured to maintain information about items, users, condition of the facility, and so forth. For example, the inventory management system may maintain data indicative of what items a particular user is ordered to pick, location of the particular user, availability of a user providing support services to others, requests for assistance, environmental status of the facility, and so forth. The inventory management system, or another system, may generate this data based on images acquired from one or more cameras. For example, the images may be used to identify a user, identify an item, track a user, and so forth.

Cameras may be located at different points within the facility to acquire images suitable for particular uses. For example, a user identification camera used to acquire images that are processed to identify a user may be configured with a field-of-view (FOV) that is likely to include the user's face. In another example, an item identification camera used to acquire images that are processed to identify an item may be configured with a FOV that is likely to include the particular item or an inventory location at which that item may be stowed. In some implementations, the cameras may have different optical or electronic characteristics based at least in part on the intended usage. For example, the user identification camera may be configured to acquire images at a rate of 15 frames per second (FPS) while the item identification camera may be configured to acquire images at the rate of 30 FPS.

In addition to placement within the facility, a camera may be oriented such that a corresponding FOV includes a portion of a scene associated with the particular use. For example, the user identification camera may be configured with a first FOV directed down or along an aisle, encompassing a portion of a scene within which a head of a user would typically appear during use of the facility. In another example, the item identification camera may be configured with a second FOV directed towards a particular inventory location or portion thereof.

The facility may include one or more fixtures. The fixture may include a central member configured to be supported above the floor of the facility. The central member may be supported by suspension from a ceiling, support mounted to a wall, support mounted to an inventory location, a floor stand, and so forth.

The fixtures may include one or more arms. The one or more arms may be extensions of the central member. In another implementation, the one or more arms may be mechanically coupled or otherwise affixed to the central member. The one or more arms may be configured to extend downward from the central member such that a tip or distal portion of the arm is closer to the floor then the root or proximal portion of the arm where it joins or merges into the central member.

Mounted on an arm may be at least one a user identification camera and at least one item identification camera. The user identification camera may be mounted on a portion of the arm that is proximal to the central member. The proximal portion of the arm is closer to the central member than a distal portion of the arm. The item identification camera may be mounted on a portion of the arm that is distal to the central member, such as near or at the tip of the arm.

As mentioned above, the user identification camera may be arranged such that the first FOV is directed down or along the aisle above which the fixture is mounted. Likewise, the item identification camera may be arranged such that the second FOV is directed towards a particular inventory location. For example, the item identification camera may have a second FOV that encompasses at least a portion of an inventory location that is positioned beneath an adjacent fixture.

Continuing In some implementations, cameras may be arranged to provide FOVs on either side of the long axis of the central member. For example, a first pair of cameras may look to the "left" of the long axis, while a second pair of cameras may look to the "right" of the long axis. In some implementations, such as in an aisle having inventory locations on two sides, arms may be present at both ends of the central member.

The fixture may include one or more light sources. The one or more light sources are configured to produce light, which may be one or more of infrared, visible, or ultraviolet light. The one or more light sources may produce light for one or more purposes. For example, the one or more light sources may produce light for use by the cameras. In another example, the one or more light sources may produce light for use by the user of the facility. This light may be directed or focused to a particular area, such as with a spotlight, or may be diffuse as with an area light.

In one implementation, one or more light sources may be arranged proximate to the cameras. While active to produce light, the one or more light sources may produce sufficient illumination so as to discourage visual inspection by the user of the camera. For example, the light source may be next to the camera and may be sufficiently bright that the brilliance of the light source is uncomfortable for the user to gaze at for an extended period of time. In another example, a light source having a reflector or otherwise configured to direct a beam of light along a particular path may be mounted proximate to the user identification camera. The light source may be configured to direct its light substantially within or along the first FOV of the user identification camera. With this arrangement, the cameras become unobtrusive or unnoticeable to the user as they are now "lost in the glare" of the light sources.

A tracking camera may be located above the aisle. In some implementations the tracking camera may be mounted to the central member of the fixture. The tracking camera is configured to acquire images from overhead that may be able to track or determine a location of the user within the facility.

One or more light sources may also be positioned or affixed to the central member. For example, a plurality of light emitting diodes (LEDs) may be configured to provide area illumination of the aisle.

A plurality of fixtures may be arranged over an aisle to provide contemporaneously acquired images from multiple points of view of the same location in the aisle. For example, an item sitting at an inventory location may be within the FOV of a first item identification camera mounted on a first fixture to the left of the inventory location as well as the FOV of a second item identification camera mounted on a second fixture to the right of the inventory location. Similarly, a user moving through the facility may have an image of their face acquired with a first user identification camera while a second user identification camera on another fixture down the aisle may have an image of a back of their head.

As used herein, the facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques and fixtures described herein may be implemented in other facilities or situations. For example, the techniques and fixtures described may be used in theaters, stadiums, or other places that may employ a plurality of cameras.

By using the techniques and fixtures described herein, a plurality of unobtrusive cameras may be mounted in the facility to provide image data well suited for the particular needs of the inventory management system. These needs may include, but are not limited to, user identification, item identification, object tracking within the facility, and so forth.

Illustrative System

An implementation of a materials handling system 100 configured to store and manage inventory items is illustrated in FIG. 1. A materials handling facility 102 (facility) comprises one or more physical structures or areas within which one or more items 104(1), 104(2), . . . , 104(Q) may be held. As used in this disclosure, letters in parenthesis such as "(Q)" indicate an integer value. The items 104 comprise physical goods, such as books, pharmaceuticals, repair parts, electronic gear, and so forth.

The facility 102 may include one or more areas designated for different functions with regard to inventory handling. In this illustration, the facility 102 includes a receiving area 106, a storage area 108, and a transition area 110.

The receiving area 106 may be configured to accept items 104, such as from suppliers, for intake into the facility 102. For example, the receiving area 106 may include a loading dock at which trucks or other freight conveyances unload the items 104.

The storage area 108 is configured to store the items 104. The storage area 108 may be arranged in various physical configurations. In one implementation, the storage area 108 may include one or more aisles 112. The aisle 112 may be configured with, or defined by, inventory locations 114 on one or both sides of the aisle 112. The inventory locations 114 may include one or more of shelves, racks, cases, cabinets, bins, floor locations, or other suitable storage mechanisms for holding, supporting, or storing the items 104. The inventory locations 114 may be affixed to the floor or another portion of the facility's 102 structure. The inventory locations 114 may also be movable such that the arrangements of aisles 112 may be reconfigurable. In some implementations, the inventory locations 114 may be configured to move independently of an outside operator. For example, the inventory locations 114 may comprise a rack with a power source and a motor, operable by a computing device to allow the rack to move from one location within the facility 102 to another.

One or more users 116(1), 116(2), . . . , 116(U) and totes 118(1), 118(2), 118, . . . , 118(T) or other material handling apparatus may move within the facility 102. For example, the user 116 may move about within the facility 102 to pick or place the items 104 in various inventory locations 114, placing the items 104 on the tote 118 for ease of transport. In other implementations, other devices such as robots, forklifts, cranes, aerial drones, and so forth, may move about the facility 102 picking, placing, or otherwise moving the items 104.

One or more sensors 120 may be configured to acquire information in the facility 102. The sensors 120 may include, but are not limited to, cameras, three-dimensional (3D) sensors, weight sensors, radio frequency (RF) receivers, temperature sensors, humidity sensors, vibration sensors, and so forth. The sensors 120 may be stationary or mobile, relative to the facility 102. For example, the inventory locations 114 may contain cameras 120(1) configured to acquire images of picking or placement of items 104 on shelves, of the users 116 in the facility 102, and so forth. In another example, the floor of the facility 102 may include weight sensors configured to determine a weight of the user 116 or other object thereupon. The sensors 120 are discussed in more detail below with regard to FIG. 2.

During operation of the facility 102, the sensors 120 may be configured to provide information suitable for tracking the location of objects within the facility 102, their movement, and so forth. For example, a series of images acquired by the camera 120(1) may indicate removal of an item 104 from a particular inventory location 114 by the user 116 and placement of the item 104 on or at least partially within the tote 118. The tote 118 is discussed in more detail below with regard to FIG. 4.

While the storage area 108 is depicted as having one or more aisles 112, inventory locations 114 storing the items 104, sensors 120, and so forth, it is understood that the receiving area 106, the transition area 110, or other areas of the facility 102 may be similarly equipped. Furthermore, the arrangement of the various areas within the facility 102 is depicted functionally rather than schematically. For example, in some implementations, multiple different receiving areas 106, storage areas 108, and transition areas 110 may be interspersed rather than segregated.

The facility 102 may include, or be coupled to, an inventory management system 122. The inventory management system 122 is configured to interact with users 116 or devices such as sensors 120, robots, material handling equipment, computing devices, and so forth, in one or more of the receiving area 106, the storage area 108, or the transition area 110. This interaction may be facilitated at least in part by sensor data received from the one or more sensors 120.

The cameras 120(1) have a field-of-view (FOV) 124. The FOV 124 is a portion of a scene of which an image may be acquired by the camera 120(1). The size of the FOV 124 for a particular camera 120(1) may be based at least in part on a focal length of the camera 120(1) and a size of the image sensor therein that is used to acquire the image. The FOV 124 may be directed along a particular direction. For example, a centerline of the FOV 124 may extend along a center of an angle described by the FOV 124 and originating from a lens or image sensor. For example, the centerline FOV 124 may originate at a vertex of a solid angle of the FOV 124 and extend to a center point of a projection of the FOV 124 onto a scene. Continuing the example, where the projection of the FOV 124 is a rectangle, the center point of the projection may comprise an intersection of lines extending from opposite corners of the rectangle.

An object within the FOV 124 may be depicted in an image acquired by the camera 120(1). Different cameras 120(1) within the facility 102 may have different FOVs 124. The cameras 120(1) may acquire image data 126. The image data 126 comprises one or more images of the scene within the FOV 124. For example, the image data 126 may comprise an image of an item 104, an inventory location 114, a user 116, a tote 118, or another object.

The inventory management system 122 may process the image data 126 to operate the facility 102. For example, the image data 126 may be processed using one or more machine vision techniques to identify the item 104, the inventory location 114, the user 116, the tote 118, or another object depicted therein. Examples of these techniques are described below with regard to FIG. 3. In another example, the inventory management system 122 may process the image data 126 to determine a location within the facility 102 of the object. For example, given a previously determined location of the camera 120(1) within the facility 102, based on the appearance of the user 116 within the FOV 124 of the camera 120(1), the location of the user 116 may be determined.

The facility 102 may be configured to receive different kinds of items 104 from various suppliers and to store them until a customer orders or retrieves one or more of the items 104. A general flow of items 104 through the facility 102 is indicated by the arrows of FIG. 1. Specifically, as illustrated in this example, items 104 may be received from one or more suppliers, such as manufacturers, distributors, wholesalers, and so forth, at the receiving area 106. In various implementations, the items 104 may include merchandise, commodities, perishables, or any suitable type of thing, depending on the nature of the enterprise that operates the facility 102.

Upon being received from a supplier at receiving area 106, the items 104 may be prepared for storage in the storage area 108. For example, in some implementations, items 104 may be unpacked or otherwise rearranged. The inventory management system 122 may include one or more software applications executing on a computer system to provide inventory management functions. These inventory management functions may include maintaining information indicative of the type, quantity, condition, cost, location, weight, or any other suitable parameters with respect to the items 104. The items 104 may be stocked, managed, or dispensed in terms of countable units, individual units, or multiple units, such as packages, cartons, crates, pallets, or other suitable aggregations. Alternatively, some items 104, such as bulk products, commodities, and so forth, may be stored in continuous or arbitrarily divisible amounts that may not be inherently organized into countable units. Such items 104 may be managed in terms of measurable quantity such as units of length, area, volume, weight, time, duration, or other dimensional properties characterized by units of measurement. Generally speaking, a quantity of an item 104 may refer to either a countable number of individual or aggregate units of an item 104 or a measurable amount of an item 104, as appropriate.

After arriving through the receiving area 106, items 104 may be stored within the storage area 108. In some implementations, like items 104 may be stored or displayed together in the inventory locations 114 such as in bins, on shelves, hanging from pegboards, and so forth. In this implementation, all items 104 of a given kind are stored in one inventory location 114. In other implementations, like items 104 may be stored in different inventory locations 114. For example, to optimize retrieval of certain items 104 having frequent turnover within a large physical facility 102, those items 104 may be stored in several different inventory locations 114 to reduce congestion that might occur at a single inventory location 114.

When a customer order specifying one or more items 104 is received, or as a user 116 progresses through the facility 102, the corresponding items 104 may be selected or "picked" from the inventory locations 114 containing those items 104. In various implementations, item picking may range from manual to completely automated picking. For example, a user 116 may have a list of items 104 they desire and may progress through the facility 102 picking items 104 from inventory locations 114 within the storage area 108 and placing those items 104 into a tote 118. In other implementations, employees of the facility 102 may pick items 104 using written or electronic pick lists derived from customer orders. These picked items 104 may be placed into the tote 118 as the employee progresses through the facility 102.

After items 104 have been picked, they may be processed at a transition area 110. The transition area 110 may be any designated area within the facility 102 where items 104 are transitioned from one location to another or from one entity to another. For example, the transition area 110 may be a packing station within the facility 102. When the item 104 arrives at the transition area 110, the items 104 may be transitioned from the storage area 108 to the packing station. Information about the transition may be maintained by the inventory management system 122.

In another example, if the items 104 are departing the facility 102, a list of the items 104 may be obtained and used by the inventory management system 122 to transition responsibility for, or custody of, the items 104 from the facility 102 to another entity. For example, a carrier may accept the items 104 for transport with that carrier accepting responsibility for the items 104 indicated in the list. In another example, a user 116 may purchase or rent the items 104 and remove the items 104 from the facility 102.

During use of the facility 102, the user 116 may move about the facility 102 to perform various tasks, such as picking or placing the items 104 at the inventory locations 114. The user 116 may benefit from information or actions that are based on input from cameras 120(1). For example, images may be used to track a pick or place of an item 104 using a plurality of cameras 120(1). By tracking the item 104, the inventory management system 122 may be able to maintain information about inventory levels, maintain information about the items 104 picked by the user 116, and so forth.

The inventory management system 122 may access or generate sensor data (not shown) about the facility 102 and the contents therein including the items 104, the users 116, the totes 118, and so forth. The sensor data may be acquired by one or more of the sensors 120, data provided by other systems, and so forth. For example, the sensors 120 may include cameras 120(1) configured to acquire image data 126 of scenes in the facility 102. The image data 126 may be processed by the inventory management system 122 to determine a location of the user 116, the tote 118, identity of the user 116, identity of the item 104 handled by the user 116, quantity of item 104 picked or placed, and so forth. The sensors 120 are discussed in more detail below with regard to FIG. 2.

Placement of the cameras 120(1) within the facility 102 may be determined based on a variety of factors. The factors may include characteristics of the camera 120(1), how the image data 126 will be used, height of the users 116 or other objects within the facility 102, and so forth.

A fixture or apparatus 128 is depicted over the aisle 112. The fixture 128 may be suspended overhead from the ceiling, supported by one or more inventory locations 114, may be held aloft by a floor stand, and so forth. Mounted to the fixture 128 may be one or more cameras 120(1). The cameras 120(1) and their arrangement on the fixture 128 and with respect to the aisle 112 are discussed in more detail below with regard to FIGS. 5-8.

The fixture 128 may include one or more light sources 130 configured to produce light. The light sources 130 may include, but are not limited to, incandescent bulbs, light emitting diodes (LEDs), electroluminescent devices, quantum dots, fluorescent bulbs, and so forth. In some implementations, the light sources 130 may comprise one or more light-directing apparatus, such as optical waveguides, fiber optics, and so forth. For example, the light sources 130 may receive light from an external resource such as a solar collector, and the light sources 130 may be configured to emit at least a portion of the received light within the facility 102.

By mounting one or more cameras 120(1) on the fixture 128, the one or more cameras 120(1) may be configured to provide FOV 124 and image data 126 suitable for use in the inventory management system 122. The overhead vantage point afforded by mounting the one or more cameras 120(1) to the fixture 128 may minimize obscuration of an object of interest from the camera 120(1). For example, given the positioning of the user identification cameras and the angle of their FOV 124 down the aisle 112, the head of one user 116 may be less likely to obscure the head of another user 116 within the field of view. Similarly, the positioning of the item identification cameras that are looking at an inventory location across the aisle 112 and to one side minimizes obscuration of the inventory location 114 and the items 104 therein by the body of a user 116 standing in front of that inventory location.

Mounting of the light sources 130 proximate to the cameras 120(1) may also improve the quality of images acquired by the cameras 120(1). For example, placement of the light sources 130 adjacent to or around the camera 120(1) may result in more even illumination of an object within the FOV 124 of that camera 120(1).

Additionally, mounting of one or more cameras 120(1) on the fixture 128 may render the one or more cameras 120(1) less obtrusive or noticeable to the users 116 of the facility 102. For example, the light emitted by the light sources 130 may be sufficiently brilliant to discourage the user 116 from looking at the cameras 120(1). By rendering the cameras 120(1) less obtrusive, and further by keeping them out of reach of the users 116, tampering or damage to the cameras 120(1) may be reduced.

Furthermore, by mounting at least a portion of the one or more cameras 120(1) used in the facility 102 to the fixture 128, large numbers of cameras 120(1) may be readily deployed. Once deployed, these cameras 120(1) may provide image data 126 of use to the inventory management system 122 during operation of the facility 102.

Figure 2:
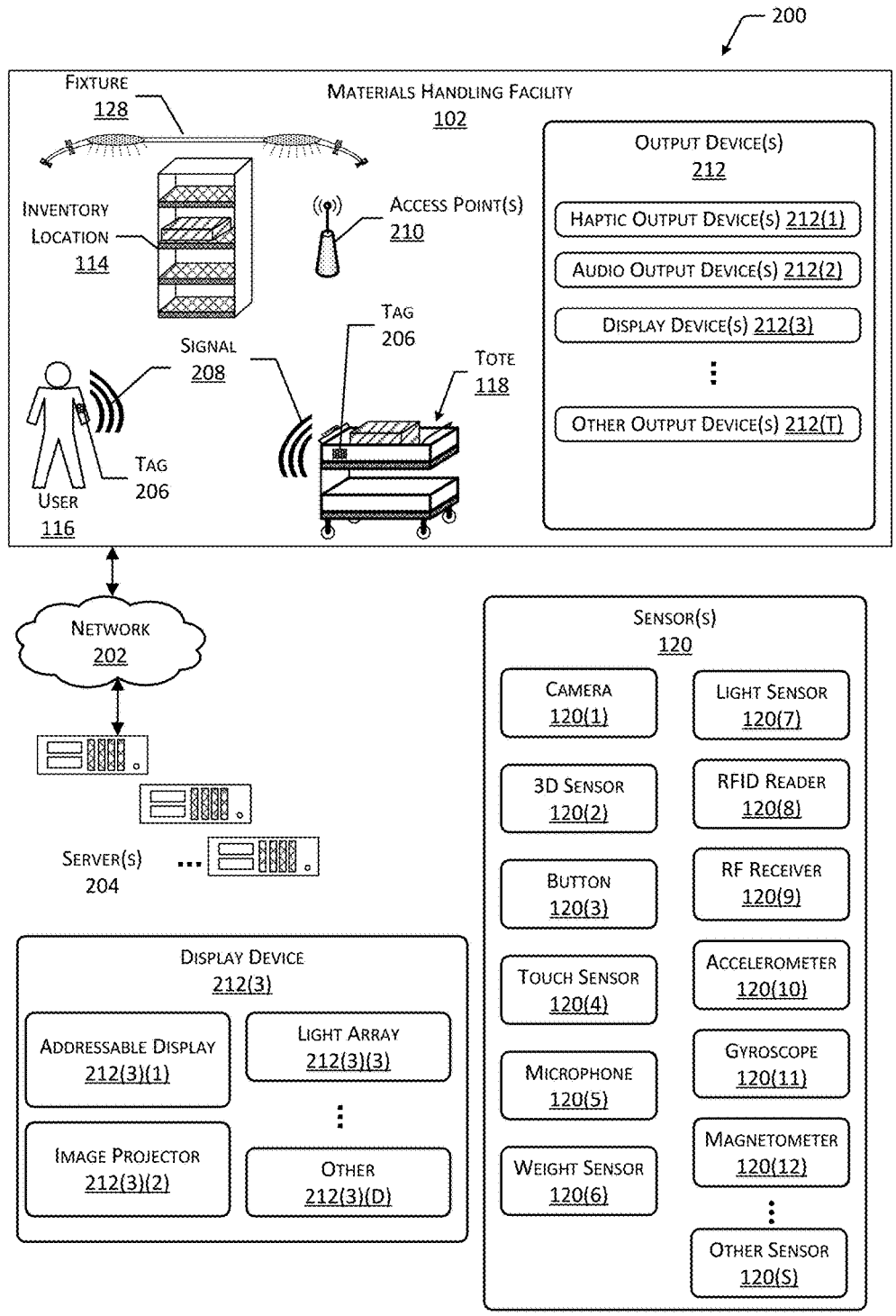
FIG. 2 is a block diagram illustrating additional details of the materials handling facility, according to some implementations.

FIG. 2 is a block diagram 200 illustrating additional details of the facility 102, according to some implementations. The facility 102 may be connected to one or more networks 202, which in turn connect to one or more servers 204. The network 202 may include private networks, public networks such as the Internet, or a combination thereof. The network 202 may utilize wired technologies (e.g., wires, fiber optic cable, and so forth), wireless technologies (e.g., radio frequency, infrared, acoustic, optical, and so forth), or other connection technologies. The network 202 is representative of any type of communication network, including one or more of data networks or voice networks. The network 202 may be implemented using wired infrastructure (e.g., copper cable, fiber optic cable, and so forth), a wireless infrastructure (e.g., cellular, microwave, satellite, and so forth), or other connection technologies.

The servers 204 may be configured to execute one or more modules or software applications associated with the inventory management system 122. While the servers 204 are illustrated as being in a location outside of the facility 102, in other implementations, at least a portion of the servers 204 may be located at the facility 102. The servers 204 are discussed in more detail below with regard to FIG. 5.

The users 116, the totes 118, or other objects in the facility 102 may be equipped with one or more tags 206. The tags 206 may be configured to emit a signal 208. In one implementation, the tag 206 may be a radio frequency identification (RFID) tag 206 configured to emit the RF signal 208 upon activation by an external signal. For example, the external signal may comprise a radio frequency signal or a magnetic field configured to energize or activate the RFID tag 206. In another implementation, the tag 206 may comprise a transmitter and a power source configured to power the transmitter. For example, the tag 206 may comprise a Bluetooth® Low Energy (BLE) transmitter and battery. In other implementations, the tag 206 may use other techniques to indicate presence of the tag 206. For example, an acoustic tag 206 may be configured to generate an ultrasonic signal that is detected by corresponding acoustic receivers. In yet another implementation, the tag 206 may be configured to emit an optical signal 208.

The inventory management system 122 may be configured to use the tags 206 for one or more of identification of the object, determining a location of the object, and so forth. For example, the users 116 may wear tags 206, the totes 118 may have tags 206 affixed, and so forth, which may be read and, based at least in part on signal strength, used to determine identity and location of the object. The tote 118 is configured to carry or otherwise transport one or more items 104. For example, the tote 118 may include a basket, a cart, a bag, and so forth. The tote 118 is discussed in more detail below with regard to FIG. 4.

Generally, the inventory management system 122 or other systems associated with the facility 102 may include any number and combination of input components, output components, and servers 204.

The one or more sensors 120 may be arranged at one or more locations within the facility 102. For example, the sensors 120 may be mounted on or within a floor, wall, at a ceiling, at an inventory location 114, on the tote 118, may be carried or worn by the user 116, and so forth.

The sensors 120 may include one or more cameras 120(1). These cameras 120(1) may include imaging sensors configured to acquire images of a scene. The imaging sensors are configured to detect light in one or more wavelengths including, but not limited to, terahertz, infrared, visible, ultraviolet, and so forth. The imaging sensors may comprise charge coupled devices (CCD), complementary metal oxide semiconductor (CMOS) devices, microbolometers, and so forth. The inventory management system 122 may use image data 126 acquired by the cameras 120(1) during operation of the facility 102. For example, the inventory management system 122 may identify items 104, users 116, totes 118, and so forth, based at least in part on their appearance within the image data 126 acquired by the cameras 120(1). The cameras 120(1) may be mounted in various locations within the facility 102. For example, cameras 120(1) may be mounted overhead such as on the fixtures 128, on inventory locations 114, may be worn or carried by users 116, may be affixed to totes 118, and so forth.

One or more 3D sensors 120(2) may also be included in the sensors 120. The 3D sensors 120(2) are configured to acquire spatial or 3D data, such as depth information, about objects within a field-of-view of this sensor. The 3D sensors 120(2) include range cameras, lidar systems, sonar systems, radar systems, structured light systems, stereo vision systems, optical interferometry systems, and so forth. The lidar system may include a laser, a detector suitable for the light generated by the laser, and an optical scanning assembly. The optical scanning assembly may be configured to direct a beam of light from the laser to a plurality of points in 3D real space, and direct laser light as reflected or fluoresced by an object at the plurality of points back to the detector. The lidar system or other 3D sensors 120(2) may be configured to generate a set of coordinates in 3D real space of objects in the facility 102. The inventory management system 122 may use the 3D data acquired to identify objects, determine a location of an object in 3D real space, and so forth.

One or more buttons 120(3) are configured to accept input from the user 116. The buttons 120(3) may comprise mechanical, capacitive, optical, or other mechanisms. For example, the buttons 120(3) may comprise mechanical switches configured to accept an applied force from a touch of the user 116 to generate an input signal. The inventory management system 122 may use data from the buttons 120(3) to receive information from the user 116. For example, the tote 118 may be configured with a button 120(3) to accept input from the user 116 and send information indicative of the input to the inventory management system 122.

The sensors 120 may include one or more touch sensors 120(4). The touch sensors 120(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 122 may use data from the touch sensors 120(4) to receive information from the user 116. For example, the touch sensor 120(4) may be integrated with the tote 118 to provide a touchscreen with which the user 116 may select from a menu one or more particular items 104 for picking.

One or more microphones 120(5) may be configured to acquire information indicative of sound present in the environment. In some implementations, arrays of microphones 120(5) may be used. These arrays may implement beamforming techniques to provide for directionality of gain. The inventory management system 122 may use the one or more microphones 120(5) to acquire information from acoustic tags 206, accept voice input from the users 116, determine the location of one or more users 116 in the facility 102, determine ambient noise level, and so forth.

One or more weight sensors 120(6) are configured to measure the weight of a load, such as the item 104, the user 116, the tote 118, and so forth. The weight sensors 120(6) may be configured to measure the weight of the load at one or more of the inventory locations 114, the tote 118, or on the floor of the facility 102. The weight sensors 120(6) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 120(6) may operate as transducers that generate one or more signals based on an applied force, such as that of the load due to gravity. The inventory management system 122 may use the data acquired by the weight sensors 120(6) to identify an object, determine a location of an object, maintain shipping records, identify the user 116, and so forth.

The sensors 120 may include one or more light sensors 120(7). The light sensors 120(7) may be configured to provide information associated with ambient lighting conditions such as a level of illumination. For example, the intensity of illumination from the light sources 130 may be adjusted responsive to the level of lighting present in the facility 102.

One more radio frequency identification (RFID) readers 120(8), near field communication (NFC) systems, and so forth, may also be included as sensors 120. For example, the RFID readers 120(8) may be configured to read the RF tags 206. Information acquired by the RFID reader 120(8) may be used by the inventory management system 122 to identify an object associated with the RF tag 206 such as the item 104, the user 116, the tote 118, and so forth. For example, based on information from the RFID readers 120(8) detecting the RF tag 206 at different times and different RFID readers 120(8) having locations in the facility 102, a velocity of the RF tag 206 may be determined.

One or more RF receivers 120(9) may also be included as sensors 120. In some implementations, the RF receivers 120(9) may be part of transceiver assemblies. The RF receivers 120(9) may be configured to acquire RF signals 208 associated with Wi-Fi™ Bluetooth®, ZigBee®, 3G, 4G, LTE, or other wireless data transmission technologies. The RF receivers 120(9) may provide information associated with data transmitted via radio frequencies, signal strength of RF signals 208, and so forth. For example, information from the RF receivers 120(9) may be used by the inventory management system 122 to determine a location of an RF source, such as a communication interface onboard the tote 118 or carried by the user 116.

The sensors 120 may include one or more accelerometers 120(10), which may be worn or carried by the user 116, mounted to the tote 118, and so forth. The accelerometers 120(10) may provide information such as the direction and magnitude of an imposed acceleration. Data such as rate of acceleration, determination of changes in direction, speed, and so forth, may be determined using the accelerometers 120(10).

A gyroscope 120(11) provides information indicative of rotation of an object affixed thereto. For example, the tote 118 or other objects may be equipped with a gyroscope 120(11) to provide data indicative of a change in orientation.

A magnetometer 120(12) may be used to determine an orientation by measuring ambient magnetic fields, such as the terrestrial magnetic field. The magnetometer 120(12) may be worn or carried by the user 116, mounted to the tote 118, and so forth. For example, the magnetometer 120(12) mounted to the tote 118 may act as a compass and provide information indicative of which direction the tote 118 is oriented.

The sensors 120 may include other sensors 120(S) as well. For example, the other sensors 120(S) may include proximity sensors, ultrasonic rangefinders, thermometers, barometric sensors, hygrometers, or biometric input devices including, but not limited to, fingerprint readers or palm scanners.

For example, the inventory management system 122 may use information acquired from thermometers and hygrometers in the facility 102 to direct the user 116 to check on delicate items 104 stored in a particular inventory location 114 that is overheating, too dry, too damp, and so forth.

In some implementations, the camera 120(1) or other sensors 120 may include hardware processors, memory, and other elements configured to perform various functions. For example, the cameras 120(1) may be configured to generate image data 126, send the image data 126 to another device such as the server 204, and so forth.

The facility 102 may include one or more access points 210 configured to establish one or more wireless networks. The access points 210 may use Wi-Fi™, NFC, Bluetooth®, or other technologies to establish wireless communications between a device and the network 202. The wireless networks may allow the devices to communicate with one or more of the sensors 120, the inventory management system 122, the tags 206, the tote 118, or other devices.

Output devices 212 may also be provided in the facility 102. The output devices 212 are configured to generate signals that may be perceived by the user 116 or are detectable by the sensors 120. In some implementations, the output devices 212 may be used to present information to the users 116.

Haptic output devices 212(1) are configured to provide a signal that results in a tactile sensation to the user 116. The haptic output devices 212(1) may use one or more mechanisms such as electrical stimulation or mechanical displacement to provide the signal. For example, the haptic output devices 212(1) may be configured to generate a modulated electrical signal, which produces an apparent tactile sensation in one or more fingers of the user 116. In another example, the haptic output devices 212(1) may comprise piezoelectric or rotary motor devices configured to provide a vibration that may be felt by the user 116.

One or more audio output devices 212(2) are configured to provide acoustic output. The acoustic output includes one or more of infrasonic sound, audible sound, or ultrasonic sound. The audio output devices 212(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

The display devices 212(3) may be configured to provide output that may be seen by the user 116 or detected by a light-sensitive detector such as a camera 120(1) or light sensor 120(7). In some implementations, the display devices 212(3) may be configured to produce output in one or more of infrared, visible, or ultraviolet light. The output may be monochrome or color. The display devices 212(3) may be emissive, reflective, or both. An emissive display device 212(3), such as using LEDs, is configured to emit light during operation. In comparison, a reflective display device 212(3), such as using an electrophoretic element, relies on ambient light to present an image. Backlights or front lights may be used to illuminate non-emissive display devices 212(3) to provide visibility of the output in conditions where the ambient light levels are low.

The display mechanisms of the display device 212(3) may include, but are not limited to, micro-electromechanical systems (MEMS), spatial light modulators, electroluminescent displays, quantum dot displays, liquid crystal on silicon (LCOS) displays, cholesteric displays, interferometric displays, liquid crystal displays, electrophoretic displays, and so forth. These mechanisms are configured to emit light, modulate incident light emitted from another source, or both. The display devices 212(3) may operate as panels, projectors, and so forth.

The display devices 212(3) may be configured to present images. For example, the display devices 212(3) may comprise an addressable display 212(3)(1). The addressable display 212(3)(1) comprises elements that may be independently addressable to produce output, such as pixels. For example, the addressable display 212(3)(1) may produce an image using a two-dimensional array of pixels.

In some implementations, the display devices 212(3) may be configured to provide non-image data, such as text characters, colors, and so forth. For example, an addressable display 212(3)(1) may comprise segmented electrophoretic display device 212(3), segmented LED, and so forth, which may be used to present information such as a SKU number, and so forth. The display devices 212(3) may also be configurable to vary the color of the segment, such as using multi-color/multi-wavelength LED segments.

The display devices 212(3) may include image projectors 212(3)(2). For example, the image projector 212(3)(2) may be configured to project an image onto objects. The image may be generated using MEMS, LCOS, lasers, and so forth. In some implementations, a timestamp projector (not shown) may comprise one or more hardware processors, memory such as computer-readable storage media, one or more communication interfaces, and one or more image projectors 212(3)(2).

The display devices 212(3) may include a light array 212(3)(3). The light array 212(3)(3) may comprise a plurality of emissive elements configurable to emit light. For example, the light array 212(3)(3) may comprise a plurality of LEDs.

The display devices 212(3) may be located at various points within the facility 102. For example, the addressable displays 212(3)(1) or the light arrays 212(3)(3) may be located on inventory locations 114, totes 118, in or on the floor of the facility 102, and so forth. The image projectors 212(3)(2) may be configured to project images on the floor, inventory locations 114, walls, users 116, totes 118, and so forth.

Other output devices 212(T) may also be present. For example, the other output devices 212(T) may include scent/odor dispensers, document printers, 3D printers or fabrication equipment, and so forth.

As described above, the facility 102 may include one or more fixtures 128. One or more sensors 120 such as cameras 120(1), 3D sensors 120(2), microphones 120(5), RFID readers 120(8), RF receivers 120(9), and so forth, may be mounted to the fixtures 128. In some implementations, one or more output devices 212 may be mounted to the fixtures 128. For example, an audio output device 212(2), an image projector 212(3)(2), and so forth, may be mounted to the fixture 128. For example, the audio output device 212(2) may be mounted on the central member, one of the arms, and so forth.

Figure 3:
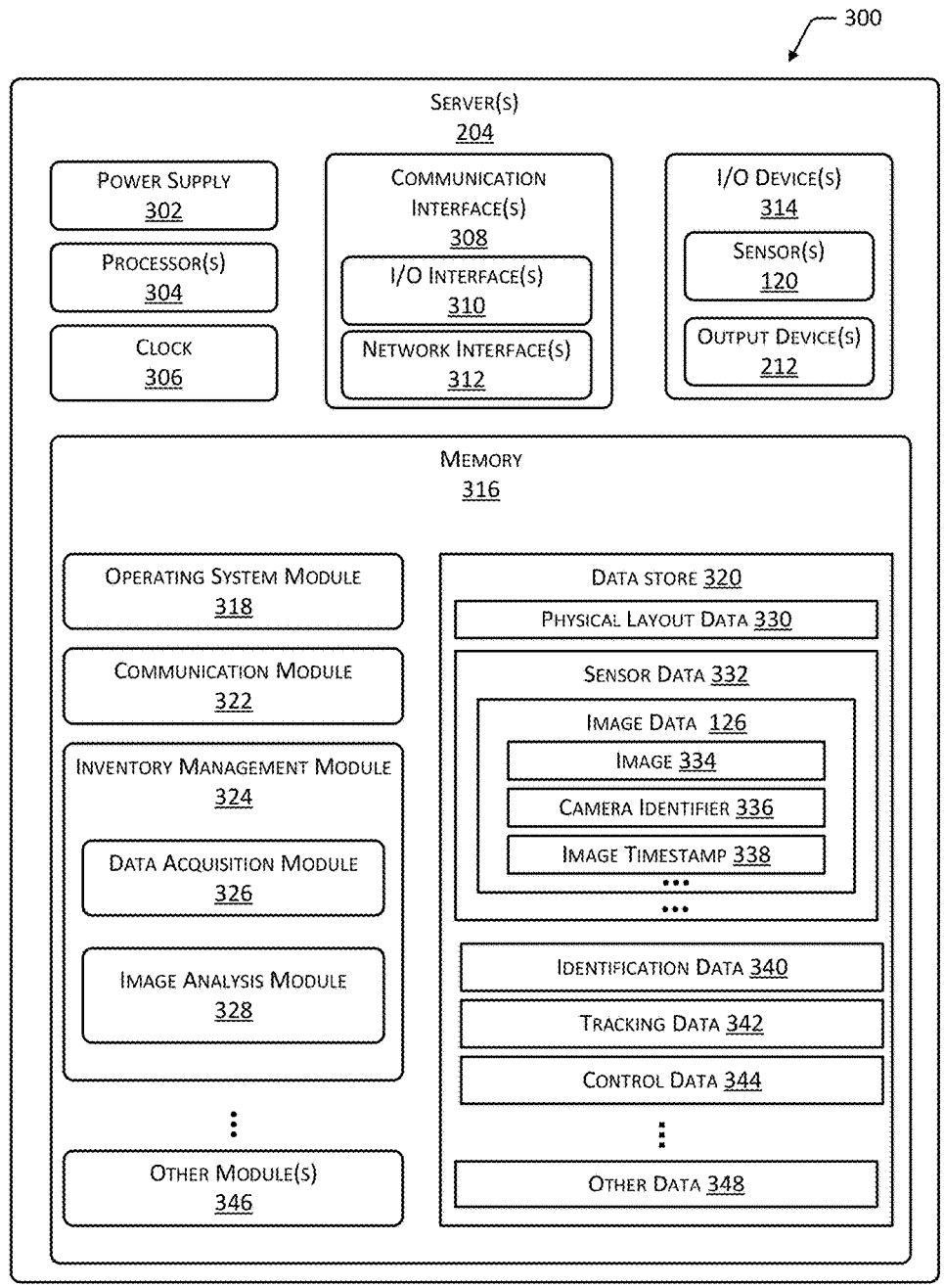
FIG. 3 illustrates a block diagram of a server configured to support operation of the materials handling facility, according to some implementations.

FIG. 3 illustrates a block diagram 300 of a server 204 configured to support operation of the facility 102, according to some implementations. The server 204 may be physically present at the facility 102, may be accessible by the network 202, or a combination of both. The server 204 does not require end-user knowledge of the physical location and configuration of the system that delivers the services. Common expressions associated with the server 204 may include "on-demand computing", "software as a service (SaaS)", "platform computing", "network-accessible platform", "cloud services", "data centers", and so forth. Services provided by the server 204 may be distributed across one or more physical or virtual devices.

One or more power supplies 302 are configured to provide electrical power suitable for operating the components in the server 204. The server 204 may include one or more hardware processors 304 (processors) configured to execute one or more stored instructions. The processors 304 may comprise one or more cores. One or more clocks 306 may provide information indicative of date, time, ticks, and so forth. For example, the processor 304 may use data from the clock 306 to generate timestamps, trigger a preprogrammed action, and so forth.

The server 204 may include one or more communication interfaces 308, such as input/output (I/O) interfaces 310, network interfaces 312, and so forth. The communication interfaces 308 enable the server 204, or components thereof, to communicate with other devices or components. The communication interfaces 308 may include one or more I/O interfaces 310. The I/O interfaces 310 may comprise Inter-Integrated Circuit (I2C), Serial Peripheral Interface (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 120, keyboard, mouse, scanner, and so forth. The I/O devices 314 may also include output devices 212 such as one or more of a display device 212(3), printer, audio speakers, and so forth. In some embodiments, the I/O devices 314 may be physically incorporated with the server 204 or may be externally placed.

The network interfaces 312 are configured to provide communications between the server 204 and other devices, such as the totes 118, routers, access points 210, and so forth. The network interfaces 312 may include devices configured to couple to personal area networks (PANs), local area networks (LANs), wide area networks (WANs), and so forth. For example, the network interfaces 312 may include devices compatible with Ethernet, Wi-Fi™, Bluetooth®, ZigBee®, and so forth.

The server 204 may also include one or more busses or other internal communications hardware or software that allow for the transfer of data between the various modules and components of the server 204.

As shown in FIG. 3, the server 204 includes one or more memories 316. The memory 316 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 316 provides storage of computer-readable instructions, data structures, program modules, and other data for the operation of the server 204. A few example functional modules are shown stored in the memory 316, although the same functionality may alternatively be implemented in hardware, firmware, or as a system on a chip (SOC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD™ operating system as promulgated by the FreeBSD Project; other UNIX™ or UNIX-like variants; a variation of the Linux™ operating system as promulgated by Linus Torvalds; the Windows® operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the servers 204, network attached storage devices, and so forth.

A communication module 322 may be configured to establish communications with one or more of the totes 118, the sensors 120, the display devices 212(3), other servers 204, or other devices. The communications may be authenticated, encrypted, and so forth.

The memory 316 may store an inventory management module 324. The inventory management module 324 is configured to provide the inventory functions as described herein with regard to the inventory management system 122. For example, the inventory management module 324 may track items 104 between different inventory locations 114, to and from the totes 118, and so forth.

The inventory management module 324 may include one or more of a data acquisition module 326 or an image analysis module 328. The data acquisition module 326 may be configured to acquire and access information associated with operation of the facility 102. This information may be stored in the data store 320. The inventory management module 324 may be configured to track objects in the facility 102 using physical layout data 330 and sensor data 332 which may be stored in the data store 320.

The physical layout data 330 comprises information about the physical configuration of the facility 102 or portions thereof. For example, the physical layout data 330 may include electronic representations of the physical structures in the facility 102, such as computer aided design (CAD) data of the aisle 112 configurations, inventory locations 114, information about which items 104 are in what inventory locations 114, real coordinates of cameras 120(1) mounted to fixtures 128, and so forth. The physical layout data 330 may include information about the presence of walls; heating, ventilation, and air conditioning (HVAC) equipment; location of doors and windows, and so forth.

The sensor data 332 comprises information acquired from, or based on, the one or more sensors 120. For example, the sensor data 332 may comprise 3D information about an object in the facility 102 as acquired by the 3D sensors 120(2) or weight data as acquired by the weight sensors 120(6).

As described above, the sensors 120 may include cameras 120(1) configured to acquire image data 126 that is stored in the data store 320. The image data 126 may comprise one or more images 334. The images 334 may include individual, still images or a sequence of images 334 such as video. The image 334 may comprise a plurality of pixels. The image data 126 also comprise metadata, such as a camera identifier 336, image timestamp 338, and so forth.

The camera identifier 336 provides information indicative of a particular camera 120(1) that acquired the image 334. The camera identifier 336 may comprise a string, value, or other data that uniquely identifies the particular camera 120(1) from other cameras 120(1) within at least a single facility 102. In some implementations, the camera identifier 336 may be unique across all facilities 102. The camera identifier 336 may comprise a media access control (MAC) address, such as of a network interface used by the camera 120(1) to communicate with the network 202. By using the camera identifier 336, the data acquisition module 326, image analysis module 328, or other modules are able to determine information such as the location within the facility 102 that corresponds to the image 334.

The image timestamp 338 comprises time information indicative of acquisition of the image 334. The image timestamp 338 may be generated using time data from an internal clock of the camera 120(1). The image timestamp 338 comprises data extrinsic to the image 334, such as metadata or file header information. In some implementations, the image timestamp 338 may be superimposed into or provided in place of at least a portion of the image 334. For example, the image timestamp 338 may comprise date and time information as obtained from the clock of the camera 120(1) and presented as a visible caption in the image data 126.

The image data 126 may include other information. For example, where the camera 120(1) includes a mechanism to change the orientation, such as a pan/tilt head, the orientation of the camera 120(1) at the time of acquisition of the image 334 may be included in the image data 126. In some implementations, the image data 334 may include the camera location in real coordinates.

The image analysis module 328 is configured to process at least a portion of the image data 126. The image analysis module 328 may generate one or more of identification data 340 or tracking data 342 and may store this data in the data store 320. The identification data 340 may identify a particular user 116, particular item 104, tote 118, or other object. For example, the identification data 340 may comprise an account name, a real name, a temporary identifier issued to a previously unregistered user 116, and so forth. The tracking data 342 provides information as to the location of an object within the facility 102. For example, the tracking data 342 may comprise data indicative of the user 116 being in aisle 112(13) in front of the inventory location 114(37).

The image analysis module 328 may be configured to use one or more machine vision techniques to identify an object in an image 334, a position of the object in the image 334, and so forth. The objects may include, but are not limited to the items 104, users 116, totes 118, and so forth.

In some implementations, the image data 126 may be used to identify the user 116 by using one or more facial recognition techniques. For example, facial characteristics of the user 116 may be determined that comprise a set of eigenvectors generated by using principal component analysis (PCA) on the image 334 of the user 116. These eigenvectors, as descriptive of a human face, may be known as "eigenfaces" or "eigenimages". In one implementation, identification may be performed at least in part by using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. The identification process may include comparing eigenvectors of the images 334 with those previously stored as facial characteristics to determine identity of the user 116. For example, the face of the user 116 may be identified using the "FaceRecognizer" class of the OpenCV library. The results may then be stored as the identification data 340 in the data store 320.

In other implementations, other libraries or techniques may be used. For example, the OKAO machine vision library as promulgated by Omron Corporation of Kyoto, Japan, may be used to recognize faces or other objects.

In some implementations, the identity of the user 116 or another object may be definitive, such as associating the user 116 with a particular user account or real name. In other implementations, the identity of the user 116 may be temporary or used to distinguish an otherwise anonymous user 116 from other users 116 of the facility 102.

The image analysis module 328 may use other techniques such as active appearance models (AAM), active shape models (ASM), Haar detectors, local binary pattern (LBP) classifiers, and so forth, to process the image data 126. In some implementations, an artificial neural network (ANN) may be used to identify an object present in an image 334. The ANN may be trained using a supervised learning algorithm such that particular objects are associated with particular training images provided to the ANN. Once trained, the ANN may be provided with the image 334 and may provide as output an identity of the object in the image 334.

The image analysis module 328 may provide the best output given images 334 in which the object depicted is oriented or posed a certain way. For example, facial recognition is likely to be most successful and accurate when the image 334 acquired by the camera 120(1) is of the full face of the user 116, squarely facing the camera 120(1). A vertical superior-inferior axis extending vertically through the user 116 from their head through their feet may be used for illustrative purposes. Perpendicular to the superior-inferior access may be a transverse line. For example, where the user 116 is standing upright and looking straight ahead with their gaze horizontal relative to the floor, their gaze is along a transverse line. Some facial recognition systems may operate best when the image 334 of the face of the user 116 is obtained from a camera 120(1) at an angle of 20° or less above or below the transverse line. At a greater angle, the facial features in the image 334 may be too distorted for reliable identification. By mounting at least a portion of the cameras 120(1) on the fixtures 128 as described below in FIGS. 5-8, images 334 of the user 116 may be acquired that satisfy these angular constraints.

For other objects, such as items 104, different angles may be suitable for acquisition of images 334. For example, the best results from the image analysis module 328 may be obtained when the images 334 of items 104 having labeling or other indicia on an upper surface are acquired from an overhead vantage point, looking down upon the item 104.

The inventory management module 324 may generate control data 344. The control data 344, stored in the data store 320, may comprise one or more instructions or commands configured to operate one or more of the cameras 120(1) or other devices. For example, the control data 344 may specify a particular frame rate, exposure settings, time or interval at which image data 126 is to be acquired, and so forth.

In some implementations, one or more of the functions associated with the data acquisition module 326 or the image analysis module 328 may be implemented by the camera 120(1). For example, a processor of the camera 120(1) may be configured to process the images 334 to recognize a face appearing in the image 334, and the processor of the camera 120(1) may provide image data 126 comprising a cropped version of the face.

Other modules 346 may also be present in the memory 316, as well as other data 348 in the data store 320. For example, the other modules 346 may include a lighting control module. The lighting control module may be configured to control operation of the light sources 130. The other data 348 may comprise information such as preset illumination levels of the light sources 130 to be implemented by the lighting control module.

Figure 4:
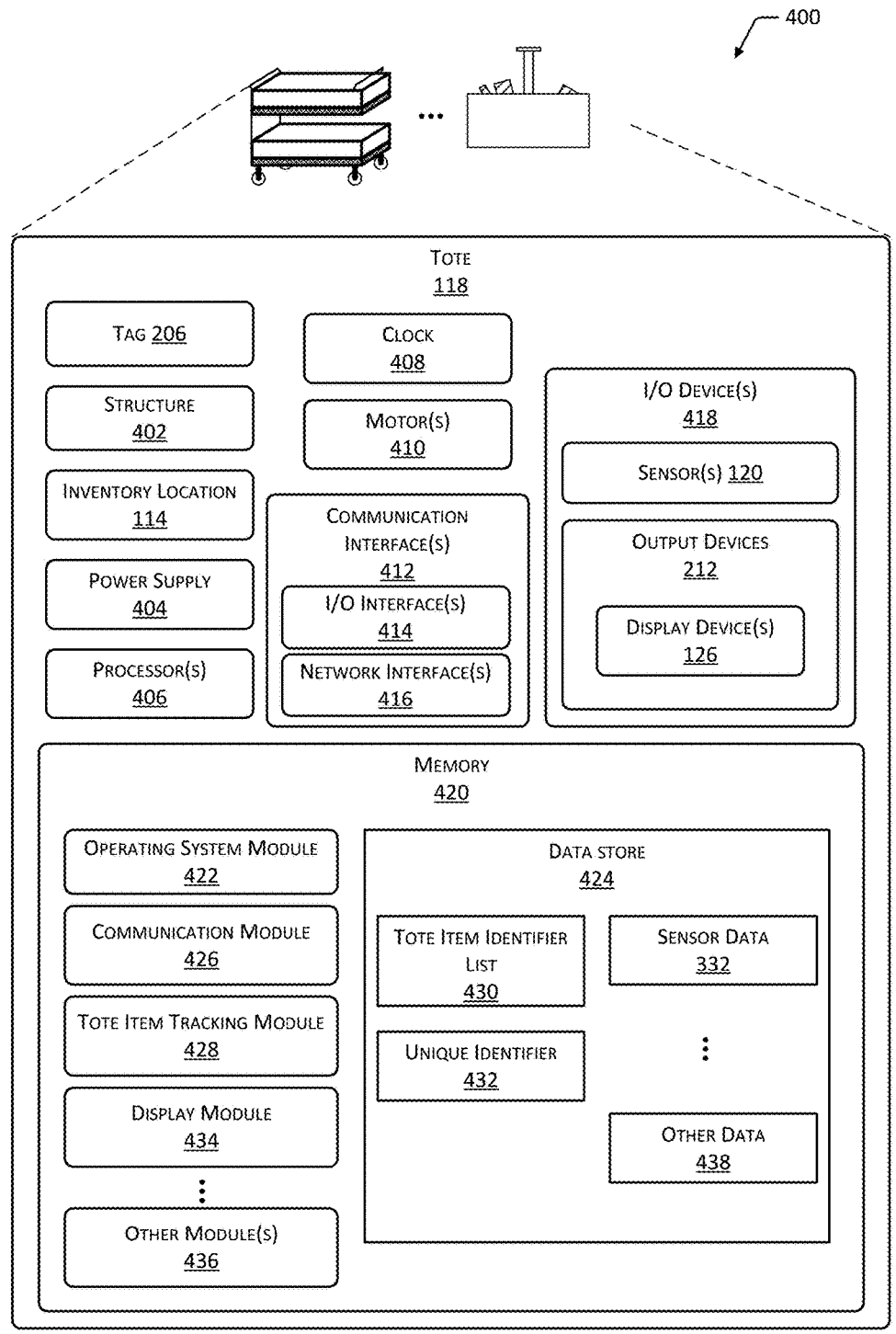
FIG. 4 illustrates a block diagram of a tote, according to some implementations.

FIG. 4 is a block diagram 400 of the tote 118, according to some implementations. The tote 118 may include several form factors such as a wheeled cart, hand-carried cart, bag, and so forth. For example, the tote 118 may include a plurality of wheels enabling the tote 118 to be moved within the facility 102.

The tote 118 may include a tag 206. The tag 206 may be affixed to, integral with, or otherwise associated with the tote 118. In some implementations, the tote 118 may have identifiers, tags 206, or other indicia thereupon. For example, a machine-readable optical code, such as a barcode, may be affixed to a side of the tote 118. The one or more cameras 120(1) supported by the fixtures 128 may acquire images 334 of the tote 118 and may use the machine-readable optical code to identify the particular tote 118.

The tote 118 may comprise a structure 402. The structure 402 may include components comprising one or more of metal, plastic, composite materials, ceramic, wood, and so forth. For example, the structure 402 may comprise a carbon-fiber frame. One or more inventory locations 114 may be integral with, or attached to, the structure 402. For example, the structure 402 may comprise a frame with wheels while the inventory location 114 comprises a basket to hold one or more items 104 during use.

The tote 118 may include a power supply 404. The power supply 404 is configured to provide electrical power suitable for operating the components in the tote 118 or coupled thereto. For example, the power supply 404 may comprise batteries, capacitors, fuel cells, photovoltaic cells, wireless power receivers, conductive couplings suitable for attachment to an external power source, and so forth.

The tote 118 may include one or more hardware processors 406 (processors) configured to execute one or more stored instructions. The processors 406 may comprise one or more cores. One or more clocks 408 may provide information indicative of date, time, ticks, and so forth. For example, the processor 406 may use data from the clock 408 to generate a timestamp, trigger a preprogrammed action, and so forth.

In some implementations, the tote 118 may include one or more motors 410 or other motive devices. The motor 410 may be configured to move or assist the user 116 in moving the tote 118 from one location to another within the facility 102. For example, in one implementation, the tote 118 may comprise a wheeled vehicle able to move within the facility 102, such as from one aisle 112 to another aisle 112.

The tote 118 may include one or more communication interfaces 412 such as I/O interfaces 414, network interfaces 416, and so forth. The communication interfaces 412 enable the tote 118, or components thereof, to communicate with other devices or components. The communication interfaces 412 may include one or more I/O interfaces 414. The I/O interfaces 414 may comprise I2C, SPI, USB, RS-232, and so forth.

The I/O interface(s) 414 may couple to one or more I/O devices 418. The I/O devices 418 may include one or more of the input devices such as the sensors 120. As described above, the sensors 120 may include cameras 120(1), buttons 120(3), touch sensors 120(4), accelerometers 120(10), gyroscopes 120(11), magnetometers 120(12), and so forth.

The I/O devices 418 may include the output devices 212 such as the haptic output devices 212(1), audio output devices 212(2), display devices 212(3), and so forth. For example, the tote 118 may comprise a display device 212(3) configured to present a graphical user interface (GUI) to the user 116. In some embodiments, the I/O devices 418 may be physically incorporated with the tote 118 or may be externally placed.

The network interfaces 416 are configured to provide communications between the tote 118 and other devices, such as other totes 118, routers, access points 210, the servers 204, and so forth. The network interfaces 416 may include devices configured to couple to PANs, LANs, WANs, and so forth. For example, the network interfaces 416 may include devices compatible with Ethernet, Wi-Fi™, Bluetooth®, ZigBee®, LTE, and so forth.

The tote 118 may also include one or more busses or other internal communications hardware or software that allow for the transfer of data between the various modules and components of the tote 118.

As shown in FIG. 4, the tote 118 includes one or more memories 420. The memory 420 comprises one or more CRSM as described above with regard to memory 316 on server 204. The memory 420 provides storage of computer-readable instructions, data structures, program modules, and other data for the operation of the tote 118. A few example functional modules are shown stored in the memory 420, although the same functionality may alternatively be implemented in hardware, firmware, or as a SOC.

The memory 420 may include at least one OS module 422. The OS module 422 is configured to manage hardware resource devices such as the I/O interfaces 414, the I/O devices 418, the communication interfaces 412, and provide various services to applications or modules executing on the processors 406. The OS module 422 may implement a variant of the FreeBSD™ operating system as promulgated by the Free BSD Project; other UNIX™ or UNIX-like variants; a variation of the Linux™ operating system, such as Android® as promulgated by Google, Inc. of Mountain View, Calif., USA; and other OS modules 422. Other OS modules 422 may be used, such as the Windows® operating system from Microsoft Corporation of Redmond, Wash., USA; the LynxOS® from LynuxWorks of San Jose, Calif., USA; and so forth.

One or more of the following modules may also be stored in the memory 420. These modules may be executed as foreground applications, background tasks, daemons, and so forth. The data store 424 may use a flat file, database, linked list, tree, executable code, script, or other data structure to store information. In some implementations, the data store 424 or a portion of the data store 424 may be distributed across one or more other devices including the servers 204, network attached storage devices, and so forth.

A communication module 426 may be configured to establish communications with one or more of the sensors 120, the servers 204, or other devices. The communications may be authenticated, encrypted, and so forth.

The memory 420 may also store a tote item tracking module 428. The tote item tracking module 428 is configured to maintain a tote item identifier list 430. The tote item identifier list 430 may comprise data indicating one or more items 104 associated with the tote 118. For example, the tote item identifier list 430 may indicate the items 104 present in the tote 118. The tote item tracking module 428 may generate or otherwise maintain a tote item identifier list 430. For example, the tote item tracking module 428 may receive input from a user 116 by way of a touch screen display with which the user 116 may enter information indicative of the item 104 placed in the tote 118. In another example, the tote item tracking module 428 may receive input from one or more I/O devices 418, such as the weight sensor 120(6), an RFID reader 120(8), and so forth. The tote item tracking module 428 may send the list of items 104 to the inventory management system 122. The tote item tracking module 428 may also be configured to receive information from the inventory management system 122. For example, a list of items 104 to be picked may be presented within a user interface on the display device 212(3) of the tote 118.

A unique identifier 432 may also be stored in the memory 420. In some implementations, the unique identifier 432 may be stored in rewritable memory, write-once-read-only memory, and so forth. For example, the unique identifier 432 may be burned into a one-time programmable, non-volatile memory, such as a programmable read-only memory (PROM). In some implementations, the unique identifier 432 may be part of a communication interface 412. For example, the unique identifier 432 may comprise a MAC address associated with a Bluetooth® interface. The communication module 426, the tote item tracking module 428, or other modules may use the unique identifier 432 when communicating with other devices such as the server 204. For example, the unique identifier 432 may be used to identify data sent by the tote 118.

The memory 420 may include a display module 434. The display module 434 may be configured to present information, such as information received from the one or more servers 204 or generated on-board the tote 118. For example, the display module 434 may comprise a markup language rendering engine configured to process user interface data received from the server 204 to generate a user interface. In some implementations, the display module 434 may also process input made to the user interface by way of input devices, such as the sensors 120.

Other modules 436 may also be stored within the memory 420. In one implementation, a data handler module may be configured to generate data indicative of the user 116, the tote 118, or another of one or more objects in range of the sensors 120 of the tote 118. For example, the data handler module may be configured to acquire data from one or more sensors 120 of the tote 118 and generate sensor data 332. For example, the sensor data 332 may comprise information from the magnetometer 120(12) indicative of orientation of the structure 402. The sensor data 332 may be stored in the data store 424 and may be sent to the server 204 for further processing. Other data 438 may also be stored within the data store 424. For example, configuration settings, pre-stored activation sequences, user interface preferences, item data, and so forth, may be stored within the data store 424.

The other modules 436 may also include a user authentication module, which may be configured to receive input and authenticate or identify a particular user 116. For example, the user 116 may enter a personal identification number (PIN) or may provide a fingerprint to a fingerprint reader to establish their identity.

The inventory management module 324 may be configured to use the image data from the one or more cameras 120(1) of the fixture 128 to track the tote 118, determine interactions between the user 116 and the tote 118, track items 104 entering or leaving the tote 118, and so forth. For example, the items 104 may be tracked by one of the cameras 120(1) moving from the inventory location 114 to the tote 118, or vice versa.

Figure 5:
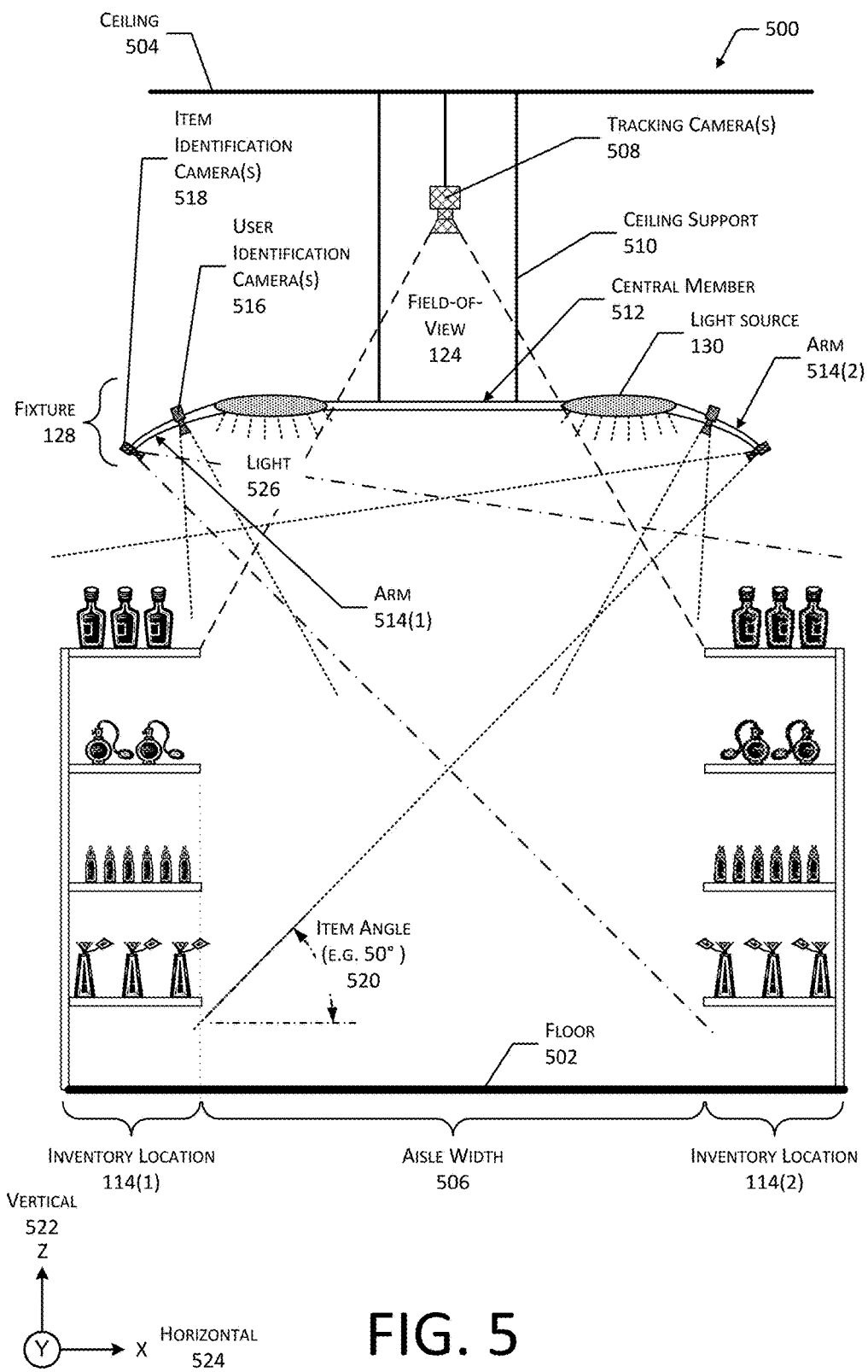
FIG. 5 illustrates a side view of an aisle in the materials handling facility and depicting an overhead fixture to which one or more cameras and light sources are affixed, according to some implementations.

FIG. 5 illustrates a side view 500 of an aisle 112 in the facility 102 and depicting the fixture 128 overhead to which one or more cameras 120(1) and light sources 130 are affixed or otherwise supported, according to some implementations.

Depicted in FIG. 5 is a floor 502 of the facility 102 with the ceiling 504 above. In this side view, inventory location 114(1) is to one side of the aisle 112 while inventory location 114(2) is to the other side of the aisle 112. The aisle 112 has an aisle width 506 extending between the inventory locations 114(1) and 114(2).

Located above the inventory locations 114(1) and 114(2) are one or more tracking cameras 508. The tracking camera 508 comprises one or more cameras 120(1). The tracking cameras 508 are configured to generate images 334 suitable for tracking objects such as users 116, totes 118, and so forth, as the objects move or are moved within the facility 102. The tracking cameras 508 may operate using one or more wavelengths of light, such as infrared, visible, ultraviolet, and so forth. The tracking cameras 508 are configured with their FOV 124 directed generally downward toward the floor 502. The tracking camera 508 may be mounted above the fixture 128 or may be mounted on or to the fixture 128. For example, the tracking camera 508 may be suspended from the ceiling 504. In another example, one or more of the tracking cameras 508 may be located proximate to, or on, one or more of arms 514 described below. The tracking camera 508 may be mounted at a height above that expected of the users 116 in the facility. For example, the tracking camera 508 may be mounted more than two meters above the floor of the ceiling.

One or more ceiling supports 510 are configured to support a central member 512 of the fixture 128 from the ceiling 504. In some implementations the central member 512 may be supported at least 2 meters above the floor 502, or may be so supported as to provide clearance below for the users 116. The ceiling supports 510 may comprise rigid members such as rods or struts, flexible members such as chain or wire, and so forth. For example, the ceiling support 510 may comprise a cable from which the fixture 128 is suspended. The central member 512 may include one or more attachment points to which the ceiling supports 510 may be coupled. For example, the attachment points may include rings, hooks, and so forth. In other implementations, the fixture 128 may be supported from one or more inventory locations 114, may be mounted to a wall, or utilize a stand resting on the floor 502.

The central member 512 of the fixture 128 may comprise one or more components. The components may comprise one or more of metal, plastic, composite materials, ceramic, wood, and so forth. For example, the central member 512 may comprise aluminum. In some implementations, the tracking camera 508 may be mounted on the central member 512. Also, as described below in more detail, the central member 512 may sport one or more light sources 130. The central member 512 may include an elongated body. For example, the central member 512 may comprise a tube, beam, prismatic shape, and so forth. Continuing the example, the central member 512 may comprise a tube having a rectangular cross section.

Extending from the central member 512 may be one or more arms 514. In one implementation, the arms 514 may comprise a portion of the central member 512. In another implementation, the arms 514 may comprise separate components that are affixed or otherwise mechanically coupled to the central member 512 during assembly of the fixture 128. A first arm 514(1) may extend from a first end of the central member 512 while a second arm 514(2) may extend from a second end of the central member 512, opposite the first end of the central member 512.

The arms 514 may have a constant cross-sectional profile. For example, the arm 514 may be a tube having a circular cross-section substantially the same at an end proximate to the central member 512 as well as distal from the central member 512. In other implementations, the arms 514 may have cross-sectional profiles that vary at different points along the arm 514. For example, the arm 514 may taper from a larger cross-sectional area at a point proximate to the central member 512 down to a smaller cross-sectional area at a point distal from the central member 512. Continuing the example, the arm 514 may narrow down to a tip that is smaller than a root.

The arm 514 may be configured to describe an arc extending downwards towards the floor 502. For example, the tip of the arm 514 may be closer to the floor 502 then the base of the arm 514. The distal end of the arm 514, relative to the member, may be least 2 meters above the floor 502 in some implementations. In another implementation, the arm 514 may comprise one or more straight sections forming a polygonal arc made up of straight sections describing overall an arc.

Mounted on the one or more arms 514 are one or more cameras 120(1). The cameras 120(1) may be configured to acquire images 334 suitable for processing by the image analysis module 328. In some implementations, the hardware of the cameras 120(1) may be the same regardless of use. In other implementations, the cameras 120(1) may be designed or modified for a particular purpose.

The fixture 128 may include one or more of user identification cameras 516, item identification cameras 518, or both. The user identification cameras 516 comprise cameras 120(1) having a position on the fixture 128 and an FOV 124 suitable for acquiring images of at least a portion of the user 116, such as the face of the user 116. As illustrated here, the user identification camera 516 is mounted on the arm 514 proximate to an end of the arm 514 that is proximal to the central member 512. The FOV 124 of the user identification camera 516 may be directed slightly downwards towards the floor 502 and also away from the central member 512 such that the FOV 124 is directed lengthwise along the aisle 112. For example, a centerline of the FOV 124 may describe a non-zero angle with respect to the long axis of the central member 512. With this configuration, the FOV 124 is such that the user identification camera 516 acquires images 334 of the face of the user 116 as they move through the aisle 112.

The item identification cameras 518 may also be mounted to the arm 514. The item identification cameras 518 comprise cameras 120(1) having a position on the fixture 128 and an FOV 124 suitable for acquiring images of at least a portion of the items 104 at or near the inventory locations 114. As illustrated here, the item identification camera 518 may be mounted on the arm 514 proximate to an end of the arm 514 that is distal from the central member 512. For example, the item identification camera 518 may be mounted at or near a tip of the arm 514. The item identification camera 518 may thus be mounted below a level of the user identification camera 516. In some implementations, the positions of the user identification camera 516 and the item identification camera 518 may be swapped.

The FOV 124 of the item identification camera 518 may be directed downwards and configured to include at least a portion of an inventory location 114. In some implementations, the item identification camera 518 may be configured such that the FOV 124 encompasses at least a portion of the inventory location 114 on an opposing side of the aisle 112.

The item identification camera 518 may be mounted on the arm 512 above the inventory location 114(1) and may be configured with an FOV 124 that includes the inventory location 114(2) that is generally below an arm 514 on an opposite end of the central member 512. The inventory location 114(2) may be directly beneath the arm 514 or underneath and to one side. For example, the FOV 124 of the item identification camera 518 may be directed below horizontally, such as toward the floor 502. The item identification camera 518 may be configured to look slightly away from the central member 512, such that the inventory location 114 within the FOV 124 is located to one side of a long axis of the central member 512. Continuing the example, the FOV 124 may look the left or right of the long axis of the central member 512, such that a centerline of the FOV 124 may describe an angle greater than zero relative to the long axis. Stated another way, the item identification camera 518 may have a FOV 124 that includes an inventory location 114 that is to the right or to the left of the inventory location 114 beneath the fixture 128.

The FOV 124 of the item identification camera 518 may have a lowermost edge that describes an item angle 520 of about 50° relative to a perpendicular line extending from a vertical face of an item 104 of the inventory location 114. For example, consider where the item 104 comprises a cube shaped box resting on a shelf of the inventory location 114. A perpendicular line may extend from the face of the cube out towards the center of the aisle 112. The item angle 520 may comprise the angle between that perpendicular line and a lowermost edge of the FOV 124 of the item identification camera 518.

By placing the user identification cameras 516 and the item identification cameras 518 as described, the image analysis module 328 may be provided with images 334 suitable for supporting operation of the facility 102. For example, the user identification camera 516 may acquire a first image 334(1). The image 334(1) may depict at least a portion of a face of the user 116. The image analysis module 328 may use one or more of the facial recognition techniques described above to identify the user 116 based at least in part on the image 334(1).

Similarly, the item identification camera 518 may acquire a second image 334(2). The image 334(2) may depict at least a portion of the inventory location 114 containing one or more items 104. In other situations, the image 334(2) may depict the user 116 interacting with an item 104 at the inventory location 114, such as picking or placing the item 104 from the inventory location 114. The image analysis module 328 may identify the one or more items 104 based at least in part on the image 334(2).

In other implementations, the image analysis module 328 may use images 334 from one or more of the user identification camera 516 or the item identification camera 518 in order to perform one or more of identifying the item 104, identifying the user 116, and so forth. For example, images 334 acquired from the user identification camera 516 may be used to identify an item 104.

One or more tracking cameras 508 may be mounted on one or more of the central member 512 or the arm 514. For example, a tracking camera 508 may mounted to a proximal portion of the arm 514, looking downward toward the area in front of the inventory location 114. In another example, the tracking camera 508 may be mounted at a midpoint along the long axis of the central member 512.

For ease of illustration, and not necessarily as a limitation, a set of three mutually orthogonal axes X, Y, and Z are depicted. The X and Y axes are within a horizontal plane, while the Z axis is vertical. Directions along the Z axis may be described as vertical 522, while directions along the X axis or Y axis may be described as horizontal 524. The Z axis may be generally aligned with the local gravitational field.

The fixture 128 may include one or more light sources 130. The light sources 130 are configured to generate light 526 using one or more of an incandescent bulb, an LED, an electroluminescent device, a quantum dot, a fluorescent bulb, and so forth. The light 526 emitted by the light sources 130 may be infrared, visible, ultraviolet, or combination of one or more of these lights 526. The one or more light sources 130 may be mounted to or supported by the central member 512. The one or more light sources 130 mounted to the central member 512 may be configured to provide directed or focused light 526. The one or more light sources 130 mounted to the central member 512 may be configured to diffuse light 526.

A first subset of one or more of the light sources 130 may be arranged proximate or near to the user identification camera 516. For example, one or more LEDs may be arranged in an annulus around the lens of the user identification camera 516. The first subset of the one or more light sources 130 may be configured to direct visible light 526 along the FOV 124 of the user identification camera 516. The light 526 may provide illumination to facilitate acquisition of the image 334 of the user 116.

The light 526 may also serve to conceal or render unobtrusive the user identification camera 516. For example, a user 116 within the FOV 124 who gazes at the user identification camera 516 would see the light 526 from the first subset of the one or more light sources 130. In some implementations, the light sources 130 may be configured to provide diffuse light 526 or may include reflector, lenses, or other devices configured to provide a focused or directed beam of light 526. The diffuse light 526 may be of sufficient intensity to dissuade the user 116 from peering at the user identification camera 516.

A second subset of one or more light sources 130 may be arranged proximate or near to the item identification camera 518. For example, one or more LEDs may be adjacent to the lens of the item identification camera 518. As above, the second subset of the one or more light sources 130 may be configured to direct light 526 along the FOV 124 of the item identification camera 518. For example, the light 526 may illuminate the items 104 on the inventory location 114. Similar to that described above with regard to the user identification camera 516, in some implementations, light sources 130 may be configured to provide diffuse light 526 or may include reflectors, lenses, or other devices configured to provide a focused or directed beam of light 526. The light 526 whether focused or diffuse, may be of a sufficient intensity to dissuade the user 116 from peering at the item identification camera 518.

The fixture 128 may provide various utilities to the devices mounted thereto, such as electrical power, communications, and so forth. For example, the fixture 128 may include a communication interface coupled to the user identification camera 516, the item identification camera 518, the light sources 130, and so forth. Continuing the example, the communication interface may provide electrical power to the user identification camera 516, the item identification camera 518, the light sources 130, and so forth. For example, the communication interface may comprise a USB interface, Power over Ethernet (PoE) interface, and so forth. The communication interface may be configured to send the image data 126 to the server 204 or other devices.

While the fixture 128 is depicted above the aisle 112, in other implementations the fixture 128 may be located at other positions within the facility 102. For example, the fixture 128 may be mounted above an end-cap at an end of an aisle 112, above an inventory location 114 such as a counter, or at other locations within the facility 112.

Figure 6:
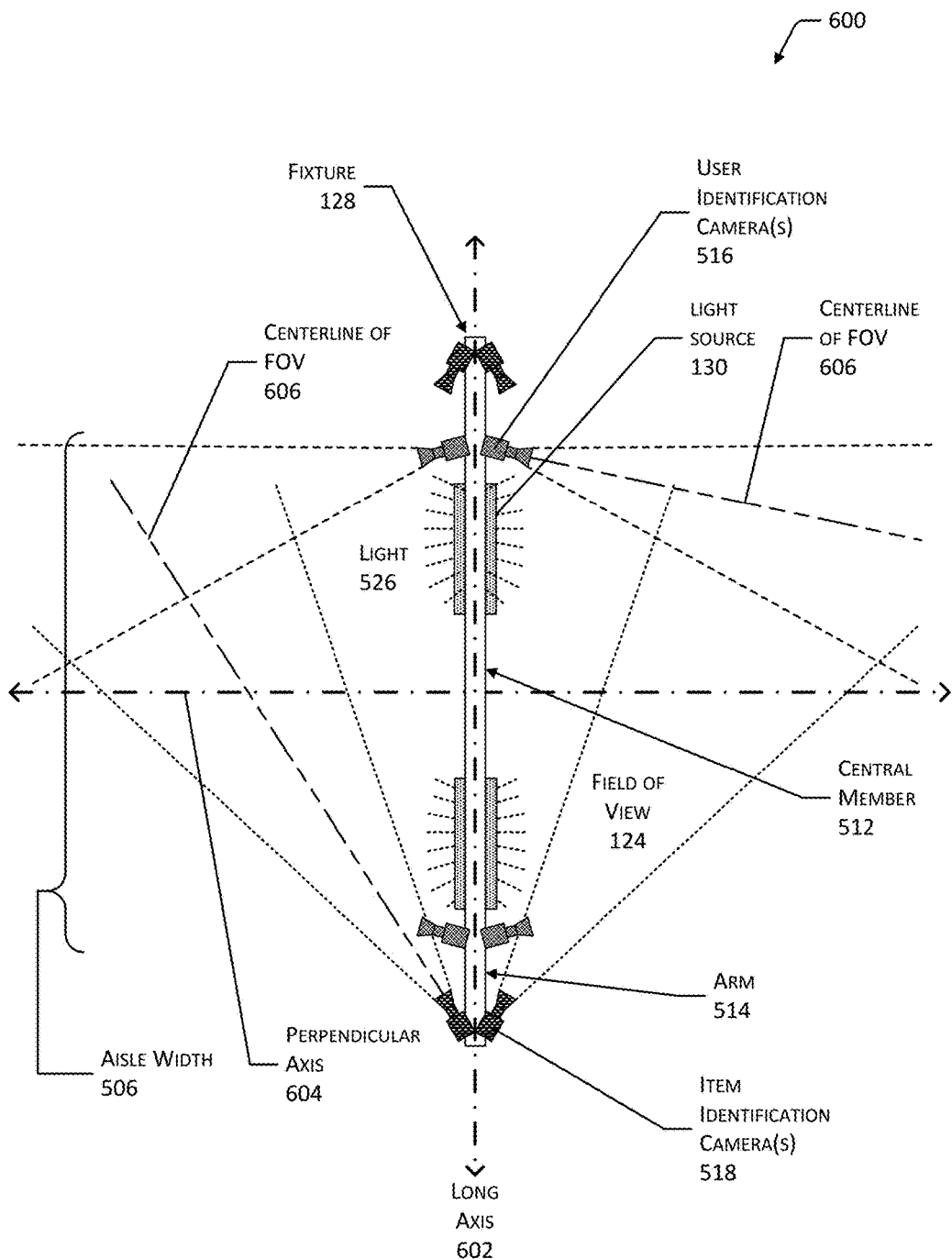
FIG. 6 illustrates an overhead view of the fixture, according to some implementations.

FIG. 6 illustrates an overhead view 600 of the fixture 128, according to some implementations. In this illustration, a single fixture 128 is depicted. The fixture 128 includes light sources 130, four user identification cameras 516, and four item identification cameras 518. While four cameras 120(1) are depicted, in other implementations other quantities of cameras 120(1) may be used.

A long axis 602 extends through the central member 512. For example, the long axis 602 may extend from one side of the aisle 112 to another as depicted in the illustrations herein. A perpendicular axis 604 is also depicted extending perpendicular to the long axis 602.

Each FOV 124 may be considered to have a centerline of FOV 606. The centerline of FOV 606 may extend along a center of an angle described by the FOV 124 and originating from a lens of a camera 120(1) or imaging sensor. The angle may be a solid angle or an angle within a particular plane. In some implementations, the edges of the FOV 124 may be symmetrical or asymmetrical with respect to a mechanism of the camera 120(1).

As depicted in this illustration, the user identification cameras 516 are depicted such that their respective centerline of FOVs 606 are directed along the perpendicular axis 604. Stated another way, the centerline of FOV 606 of the user identification camera 516 is more parallel to the perpendicular axis 604 than the long axis 602. For example, the FOV 124 of the user identification camera 516 is down the length of the aisle 112.

In comparison, a centerline of FOV 606 of the item identification cameras 518 are directed along the long axis 602, to the inventory location 114 across the aisle 112 and to one side of the fixture 128. Stated another way, the centerline of FOV 606 of the item identification camera 518 is more parallel to the long axis 602 than the perpendicular axis 604.

Figure 7:
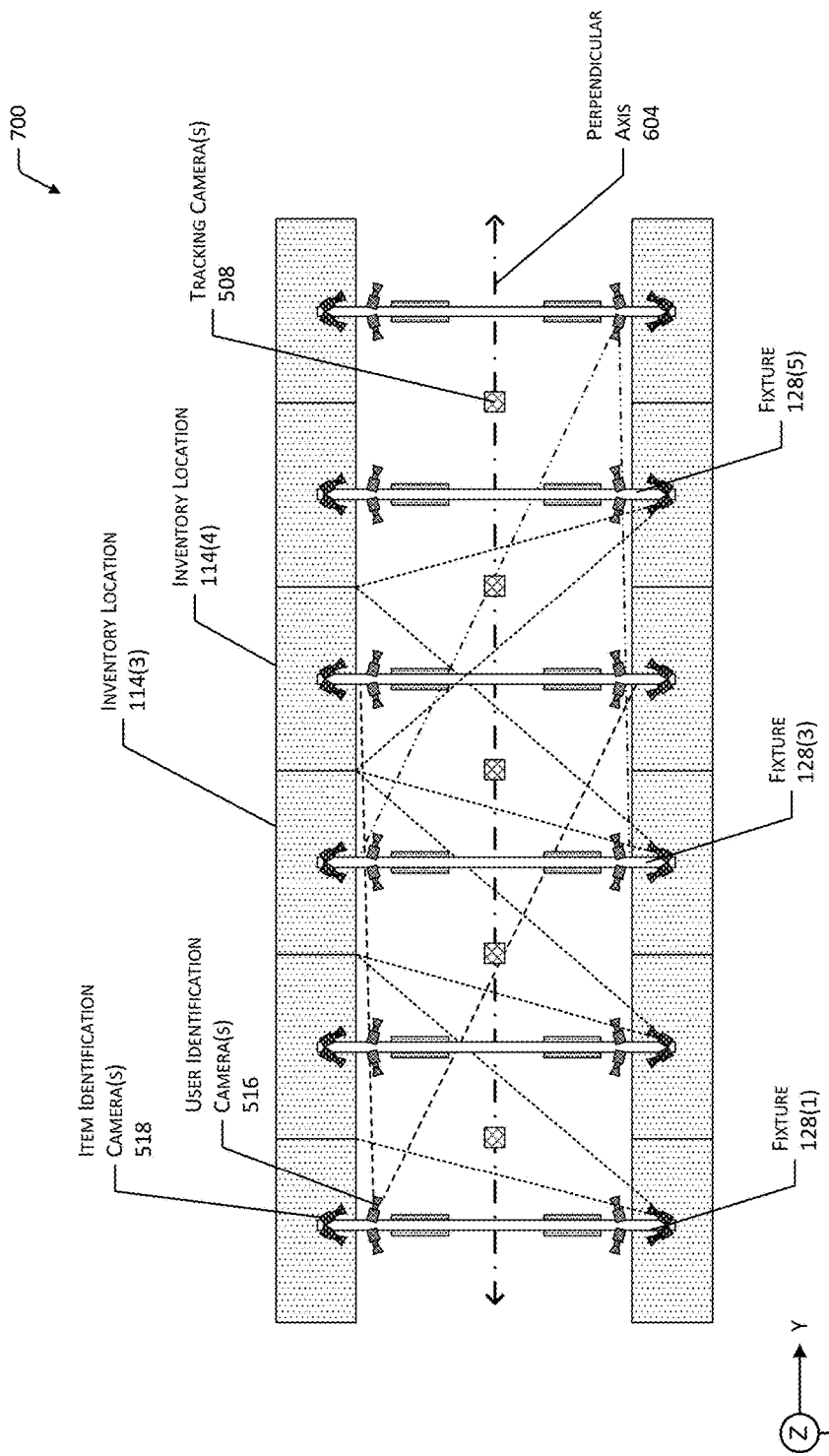
FIG. 7 illustrates an overhead view of the aisle in the materials handling facility including a plurality of fixtures, according to some implementations.

FIG. 7 illustrates an overhead view 700 of the aisle 112 in the facility 102 including a plurality of fixtures 128, according to some implementations. A plurality of apparatuses such as fixtures 128(1), 128(2), . . . , 128(F) may be arranged adjacent or side-by-side to one another as depicted here. Each fixture 128 may support user identification cameras 516, item identification cameras 518, tracking cameras 508, light sources 130, and so forth. In this illustration, the tracking cameras 508 are located between the fixtures 128 generally along a centerline of the aisle 112. In another implementation, the tracking cameras 508 may be mounted to the arms 514, such as proximate to the user identification cameras 516. The tracking cameras 508 may be supported from the ceiling 504, from cross members or cables extending between fixtures 128, and so forth.

As depicted, the fixtures 128 hold the cameras 120(1) such that the respective FOVs 124 allow for acquisition of images 334 throughout the aisle 112. For example, the item identification camera 518 of the fixture 128(3) looks across the aisle 112 with a FOV 124 that acquires images 334 of the inventory location 114(4) from one point of view. The inventory location 114(4) is below, but not directly beneath, the fixture 128(3). In another example, the item identification camera 518 of the fixture 128(3) has a FOV 124 that includes the inventory location 114(4) that is adjacent to the inventory location 114(3) that directly underneath the opposite arm 514 to that holding the item identification camera 518.

Meanwhile, the item identification camera 518 of the fixture 128(5) looks across the aisle 112 and acquires images 334 of the inventory location 114(4) from another point of view. In a similar fashion, the cameras 120(1) of the plurality of fixtures 128 acquire images 334 of the other inventory locations 114 and of users 116 as they move throughout the facility 102.

In some implementations, the light sources 130 may extend parallel to the perpendicular axis 604 and may be supported by two or more fixtures 128. For example, the light sources 130 may comprise fluorescent light sources mounted to either side of the center of the central member 512.

Figure 8:
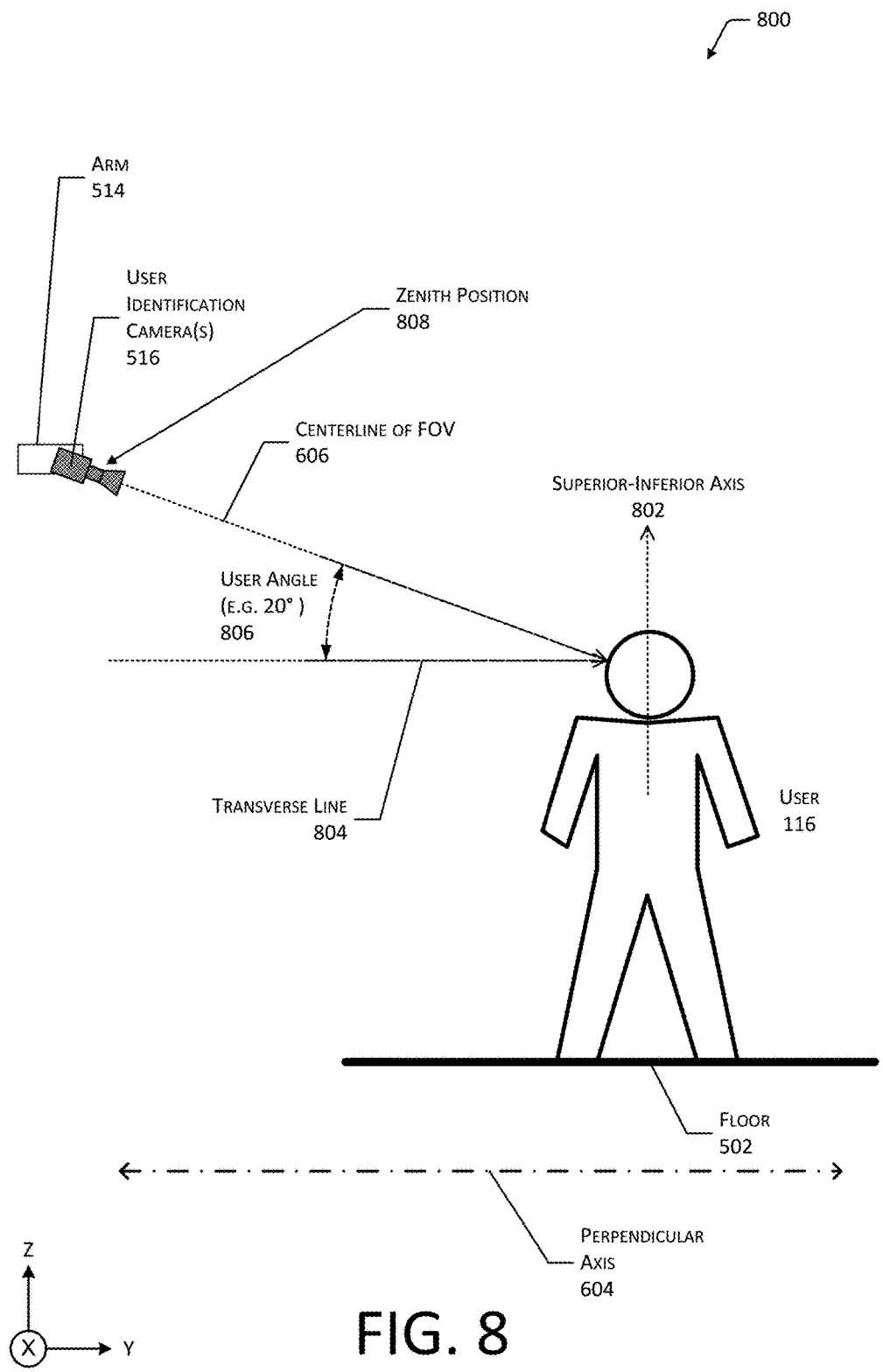
FIG. 8 illustrates a side view of the aisle in the materials handling facility and the camera on the fixture used to acquire an image of the user, according to some implementations.

FIG. 8 illustrates a side view 800 of the aisle 112 in the facility 102, according to some implementations. In this illustration, the user identification camera 516 on the fixture 128 used to acquire an image 334 of the user 116 is depicted. A centerline of FOV 606 of the user identification camera 516 is also depicted, directed generally towards the head of the user 116

As the user 116 stands on the floor 502, a superior-inferior axis 802 of the body of the user 116 is depicted. A transverse line 804 is depicted as perpendicular to the superior-inferior axis 802. For example, the superior-inferior axis 802 may be parallel to the Z axis depicted. The transverse line 804 may thus comprise a line in the X-Y plane.

In some implementations, the image analysis module 328 may most reliably identify the face of the user 116 when the image 334 being processed is obtained at a user angle 806 angle of less than or equal to about 20 degrees from the transverse line 804. For example, the optimal image 334 provided to the image analysis module 328 may be that of the face of the user 116 squarely in front of the user identification camera 516. Continuing the example, the face depicted in the optimal image 334 may be zero yaw and zero pitch relative to the centerline of FOV 606. However, the image analysis module 328 may still operate with suitable accuracy up to a user angle 806 or pitch of about 20 degrees or less.

The user identification camera 516 is depicted at a zenith position 808, such as when suspended from the arm 514 of the fixture 128. The centerline of FOV 606 of the user identification camera 516 in the zenith position 808 describes a user angle 806 of less than or equal to about 20 degrees relative to the transverse line 804.

The placement of the user identification cameras 516 on the arm 514 of the fixture 128 provides sufficient height that the same image 334 may include multiple faces, allowing for the identification of multiple users 116. Furthermore, the orientation of the centerline of FOV 606 may be made such that, beyond a threshold distance, the face of the user 116 will be depicted in the image 334 with a user angle 806 of about 20 degrees or less. As a result, the image analysis module 328 may be able to reliably compare the face in the image 334 with previously stored data to determine the identity of the user 116.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
a central member having an elongated body with a long axis and one or more attachment points to support the elongated body above a floor;
a first arm extending from the elongated body of the central member;
a second arm extending from the elongated body of the central member at an end opposite the first arm;
a user identification camera having a first field-of-view (FOV) configured to acquire images of at least a portion of a user, wherein:
the user identification camera is mounted at a first position on the first arm near the central member;
a centerline of the first FOV is directed to form a non-zero angle relative to the long axis of the central member; and
the user identification camera is configured to acquire the images of the at least a portion of the user at a first rate;
an item identification camera having a second FOV configured to acquire images of at least a portion of one or more items at an inventory location, wherein:
the item identification camera is mounted at a second position on the first arm farther away from the central member than the first position;
the second FOV is directed to include the at least a portion of the one or more items at the inventory location below a far end of the second arm relative to the central member; and
the item identification camera is configured to acquire the images of the at least a portion of the one or more items at the inventory location at a second rate that is different from the first rate; and
one or more light sources to produce at least visible light to one or more of the floor or the inventory location.

2. The system of claim 1, further comprising:
a hardware processor configured to execute computer-executable instructions to:
receive a first image from the user identification camera, wherein the first image depicts at least a portion of a face of the user;
identify the user based at least in part on the first image;
receive a second image from the item identification camera, wherein the second image depicts the at least a portion of the one or more items at the inventory location; and
identify the one or more items based at least in part on the second image.

3. The system of claim 1, wherein:
a first portion of the one or more light sources are next to the user identification camera and direct the visible light within the first FOV; and
a second portion of the one or more light sources are next to the item identification camera and direct the visible light within the second FOV.

4. An apparatus comprising:
a first member supported above a floor and having a long axis, wherein the first member has a first end and a second end at opposite ends of the long axis;
a first arm extending from the first end of the first member;
a first camera for acquiring images that depict at least a portion of a user, the first camera mounted at a proximal end, relative to the first member, of the first arm, wherein the first camera has a first field-of-view (FOV) directed away from the long axis of the first member, and the first camera is configured to acquire the images of the at least a portion of the user at a first rate; and
a second camera for acquiring images that depict at least a portion of one or more items at an inventory location, the second camera mounted at a distal end, relative to the first member, of the first arm, wherein the second camera has a second FOV directed to include the at least a portion of the one or more items at the inventory location located below the second end of the first member, and the second camera is configured to acquire the images of the at least a portion of the one or more items at the inventory location at a second rate.

5. The apparatus of claim 4, further comprising:
a first set of one or more light sources proximate to the first camera to direct visible light within the first FOV;

a second set of one or more light sources proximate to the second camera to direct visible light within the second FOV; and wherein one or more light sources of one or more of the first set of one or more light sources or the second set of one or more light sources comprise one or more of:
an incandescent bulb,
a light emitting diode (LED),
an electroluminescent device,
a quantum dot, or
a fluorescent bulb.

6. The apparatus of claim 4, further comprising:
a third camera mounted at the first member, wherein the third camera has a third FOV directed downward toward the floor; and
one or more light sources mounted at the first member, wherein the one or more light sources generate light using one or more of:
an incandescent bulb,
a light emitting diode (LED),
an electroluminescent device,
a quantum dot, or
a fluorescent bulb.

7. The apparatus of claim 4, wherein the at least a portion of the one or more items at the inventory location to which the second FOV is directed is located to one side of the long axis of the first member.

8. The apparatus of claim 4, wherein the second camera is mounted below a level of the first camera such that the second camera is closer to the floor.

9. The apparatus of claim 4, wherein the first arm curves downwards towards the floor.

10. The apparatus of claim 4, further comprising:
a ceiling support having one or more of a rigid or flexible member suspending the first member from a ceiling.

11. The apparatus of claim 4, further comprising:
a second arm extending from the second end of the first member;
a third camera mounted at a proximal end, relative to the first member, of the second arm, wherein the third camera has a third FOV directed away from the long axis of the first member; and
a fourth camera mounted at a distal end, relative to the first member, of the second arm, wherein the fourth camera has a fourth FOV directed to include at least a portion of a second inventory location located below the first end of the first member.

12. The apparatus of claim 4, further comprising:
a communication interface coupled to the first camera and the second camera, wherein the communication interface is configured to:
provide electrical power to the first camera and the second camera; and
send, to a computing device, one or more images from one or more of the first camera or the second camera.

13. A system comprising:
a plurality of apparatuses arranged adjacent to one another, each of the plurality of apparatuses comprising:
a member having a first end and a second end, a long axis extending through the first end and the second end;
a first arm extending from the first end of the member;
a first user identification camera mounted at a proximal end, relative to the member, of the first arm, wherein the first user identification camera has a first field-of-view (FOV) directed away from the long axis of the member to a first side of the long axis, and the first user identification camera is configured to acquire images of a user at a first rate; and
a first item identification camera mounted at a distal end, relative to the member, of the first arm, wherein the first item identification camera has a second FOV directed to include at least a portion of an inventory location located below the second end of the member and to the first side of the long axis, and the first item identification camera is configured to acquire images of one or more items at a second rate that is higher than the first rate; and
a computing device comprising a hardware processor configured to execute computer-executable instructions to:
receive first image data from each of the first user identification cameras;
identify a user appearing in the first image data;
receive second image data from each of the first item identification cameras depicting the at least a portion of the inventory location; and
identify an item appearing in the second image data.

14. The system of claim 13 further comprising:
a second user identification camera mounted at the proximal end, relative to the member, of the first arm, wherein the second user identification camera has a third FOV directed away from the long axis of the member to a second side of the long axis; and
a second item identification camera mounted at the distal end, relative to the member, of the first arm, wherein the second item identification camera has a fourth FOV directed to include at least a portion of a second inventory location located below the second end of the member and to the second side of the long axis.

15. The system of claim 13, wherein the at least a portion of the inventory location in the second FOV is located below another of the plurality of apparatuses.

16. The system of claim 13, wherein each of the plurality of apparatuses is supported such that the distal end, relative to the member, of the first arm is at least 2 meters above a floor.

17. The system of claim 13, further comprising a plurality of inventory locations arranged along at least one side of an aisle, wherein the long axis of the member for the each of the plurality of apparatuses is substantially perpendicular to a long axis of the aisle.

18. The system of claim 13, further comprising:
a tracking camera mounted at the member, wherein the tracking camera has a third FOV directed downward; and
one or more light sources mounted at the member; and
the hardware processor configured to execute the computer-executable instructions are further executable to:
receive third image data from the tracking camera; and
track, within a facility, location of one or more of the user or another object appearing in the third image data.

19. The system of claim 13, further comprising:
a first set of one or more light sources adjacent to the first user identification camera and directing visible light within the first FOV; and
a second set of one or more light sources adjacent to the first item identification camera and directing visible light towards the at least a portion of the inventory location in the second FOV.

20. The system of claim 13, wherein:
the plurality of apparatuses is arranged above an aisle;

the first FOV is directed towards an end of the aisle; and
the second FOV is directed towards a side of the aisle.

\* \* \* \* \*

UNITED STATES PATENT AND TRADEMARK OFFICE
CERTIFICATE OF CORRECTION

PATENT NO.         : 10,212,319 B1
APPLICATION NO.    : 14/532560
DATED              : February 19, 2019
INVENTOR(S)        : Thomas Edward Carter, II Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 520 days.

Signed and Sealed this
Thirtieth Day of July, 2019

Andrei Iancu
*Director of the United States Patent and Trademark Office*